(12) United States Patent
Hughes et al.

(10) Patent No.: US 8,420,760 B2
(45) Date of Patent: Apr. 16, 2013

(54) LONG CHAIN BRANCHED PROPYLENE-ALPHA-OLEFIN COPOLYMERS

(75) Inventors: Morgan M. Hughes, Angleton, TX (US); Patricia Ansems, Lake Jackson, TX (US); Carl N. Iverson, Houston, TX (US); Lisa S. Madenjian, Lake Jackson, TX (US); Daniel D. VanderLende, Sugar Land, TX (US)

(73) Assignee: Dow Global Technologies LLC, Midland, MI (US)

( * ) Notice: Subject to any disclaimer, the term of this patent is extended or adjusted under 35 U.S.C. 154(b) by 443 days.

(21) Appl. No.: 12/742,325

(22) PCT Filed: Nov. 6, 2008

(86) PCT No.: PCT/US2008/082599
§ 371 (c)(1),
(2), (4) Date: May 11, 2010

(87) PCT Pub. No.: WO2009/067337
PCT Pub. Date: May 28, 2009

(65) Prior Publication Data
US 2010/0285253 A1    Nov. 11, 2010

Related U.S. Application Data

(60) Provisional application No. 60/988,999, filed on Nov. 19, 2007.

(51) Int. Cl.
*C08F 210/06* (2006.01)
*C08F 210/02* (2006.01)
*C08F 210/16* (2006.01)

(52) U.S. Cl.
USPC ............................ 526/348; 526/351; 526/352

(58) Field of Classification Search .................. 526/348, 526/351
See application file for complete search history.

(56) References Cited

U.S. PATENT DOCUMENTS 3,485,706 A    12/1969  Evans
3,914,342 A    10/1975  Mitchell
(Continued)

FOREIGN PATENT DOCUMENTS

EP    594218    9/1987
EP    277003    8/1988
(Continued)

OTHER PUBLICATIONS

A.V. Ramamurthy, "Wall Slip in Viscous Fluids and Influence of Materials of Construction", Journal of Rheology, 30(2), 337-357, (1986).

(Continued)

*Primary Examiner* — Rip A. Lee
(74) *Attorney, Agent, or Firm* — Whyte Hirschboeck Dudek SC

(57) ABSTRACT

Substantially isotaclic propylene interpolyraets comprise (A) at least 60 weight percent (wt %) units derived from propylene, and (B) between greater than zero and 40 wt % units derived from ethylene, the propylene interpolyrner further characterized by at least one of the following properties: (1) a ratio of less than 1 measured at interpolyraer number average molecular weight (Mn), (2) a relative compositional drift of less than 50%, arid (3) propylene chain segments having a chain isotacticity triad index of at least 70 mole percent.

20 Claims, 15 Drawing Sheets

U.S. PATENT DOCUMENTS

| | | | |
|---|---|---|---|
| 3,953,413 A | 4/1976 | Hwang et al. | |
| 4,173,548 A | 11/1979 | Pullukat et al. | |
| 4,322,027 A | 3/1982 | Reba | |
| 4,330,646 A | 5/1982 | Sakurai et al. | |
| 4,413,110 A | 11/1983 | Kavesh et al. | |
| 4,500,648 A | 2/1985 | Malpass | |
| 4,564,660 A | 1/1986 | Williams et al. | |
| 4,612,300 A | 9/1986 | Coleman, III | |
| 4,663,220 A | 5/1987 | Wisneski et al. | |
| 4,665,208 A | 5/1987 | Welborn, Jr. et al. | |
| 4,668,566 A | 5/1987 | Braun | |
| 4,835,219 A | 5/1989 | Tajima et al. | |
| 4,874,734 A | 10/1989 | Kioka et al. | |
| 4,908,463 A | 3/1990 | Bottelberghe | |
| 4,924,018 A | 5/1990 | Bottelberghe | |
| 4,952,540 A | 8/1990 | Kioka et al. | |
| 4,968,827 A | 11/1990 | Davis | |
| 4,981,927 A | 1/1991 | Rekers et al. | |
| 5,066,741 A | 11/1991 | Campbell, Jr. | |
| 5,091,352 A | 2/1992 | Kioka et al. | |
| 5,103,031 A | 4/1992 | Smith, Jr. | |
| 5,153,157 A | 10/1992 | Hlatky et al. | |
| 5,157,137 A | 10/1992 | Sangokoya | |
| 5,198,401 A | 3/1993 | Turner et al. | |
| 5,204,419 A | 4/1993 | Tsutsui et al. | |
| 5,206,197 A | 4/1993 | Campbell, Jr. | |
| 5,206,199 A | 4/1993 | Kioka et al. | |
| 5,235,081 A | 8/1993 | Sangokoya | |
| 5,241,025 A | 8/1993 | Hlatky et al. | |
| 5,248,801 A | 9/1993 | Sangokoya | |
| 5,272,236 A | 12/1993 | Lai et al. | |
| 5,308,815 A | 5/1994 | Sangokoya | |
| 5,329,032 A | 7/1994 | Tran et al. | |
| 5,384,299 A | 1/1995 | Turner et al. | |
| 5,387,568 A | 2/1995 | Ewen et al. | |
| 5,391,529 A | 2/1995 | Sangokoya | |
| 5,391,793 A | 2/1995 | Marks et al. | |
| 5,453,410 A | 9/1995 | Kolthammer et al. | |
| 5,502,124 A | 3/1996 | Crowther et al. | |
| 5,685,128 A | 11/1997 | Chum et al. | |
| 5,693,838 A | 12/1997 | Sangokoya et al. | |
| 5,731,253 A | 3/1998 | Sangokoya | |
| 5,731,451 A | 3/1998 | Smith et al. | |
| 5,744,565 A | 4/1998 | Denkinger et al. | |
| 5,849,852 A | 12/1998 | Koch et al. | |
| 5,869,575 A | 2/1999 | Kolthammer et al. | |
| 5,869,723 A | 2/1999 | Hinokuma et al. | |
| 6,140,521 A | 10/2000 | Chen et al. | |
| 6,160,146 A | 12/2000 | Chen et al. | |
| 6,214,760 B1 | 4/2001 | Chen et al. | |
| 6,525,157 B2 | 2/2003 | Cozewith et al. | |
| 6,573,352 B1 * | 6/2003 | Tatsumi et al. | 526/351 |
| 6,696,379 B1 | 2/2004 | Carnahan et al. | |
| 6,924,342 B2 | 8/2005 | Stevens et al. | |
| 6,960,635 B2 | 11/2005 | Stevens et al. | |
| 7,223,828 B2 * | 5/2007 | Arjunan | 526/336 |
| 7,439,312 B2 * | 10/2008 | Arjunan et al. | 526/116 |
| 7,893,161 B2 * | 2/2011 | Chang et al. | 525/191 |
| 2004/0010103 A1 | 1/2004 | Boussie et al. | |
| 2006/0199006 A1 | 9/2006 | Poon et al. | |
| 2006/0199030 A1 | 9/2006 | Liang et al. | |
| 2006/0199744 A1 | 9/2006 | Walton et al. | |
| 2006/0199872 A1 | 9/2006 | Prieto et al. | |
| 2006/0199884 A1 | 9/2006 | Hoenig et al. | |
| 2006/0199887 A1 | 9/2006 | Liang et al. | |
| 2006/0199896 A1 | 9/2006 | Walton et al. | |
| 2006/0199897 A1 | 9/2006 | Karjala et al. | |
| 2006/0199905 A1 | 9/2006 | Hughes et al. | |
| 2006/0199906 A1 | 9/2006 | Walton et al. | |
| 2006/0199907 A1 | 9/2006 | Chang et al. | |
| 2006/0199908 A1 | 9/2006 | Cheung et al. | |
| 2006/0199910 A1 | 9/2006 | Walton et al. | |
| 2006/0199911 A1 | 9/2006 | Markovich et al. | |
| 2006/0199912 A1 | 9/2006 | Fuchs et al. | |
| 2006/0199914 A1 | 9/2006 | Harris et al. | |
| 2006/0199930 A1 | 9/2006 | Li Pi Shan et al. | |
| 2006/0199931 A1 | 9/2006 | Poon et al. | |

FOREIGN PATENT DOCUMENTS

| | | |
|---|---|---|
| EP | 277004 | 8/1988 |
| EP | 279586 | 8/1988 |
| EP | 426637 | 5/1991 |
| EP | 495375 | 7/1992 |
| EP | 500944 | 9/1992 |
| EP | 520732 | 12/1992 |
| EP | 561476 | 9/1993 |
| EP | 570982 | 11/1993 |
| EP | 573120 | 12/1993 |
| EP | 573403 | 12/1993 |
| EP | 615981 | 9/1994 |
| EP | 608369 B1 | 5/1997 |
| EP | 781299 B1 | 7/1997 |
| WO | 9407928 | 4/1994 |
| WO | 9410180 | 5/1994 |
| WO | 9514044 | 5/1995 |
| WO | 9807515 | 2/1998 |
| WO | 9809996 | 3/1998 |
| WO | 9832775 | 7/1998 |
| WO | 9918135 | 4/1999 |
| WO | 02102863 | 12/2002 |
| WO | 03040442 | 5/2003 |
| WO | 2005021622 | 3/2005 |
| WO | 2005090427 | 5/2005 |
| WO | 2006020624 | 2/2006 |
| WO | 2007136493 | 11/2007 |

OTHER PUBLICATIONS

J.C. Randall, "A Review of High Resolution Liquid 13Carbon Nuclear Magnetic Resonance Characterizations of Ethylene-Based Polymers", JMS-Rev. Macromol. Chem. Phys., c29(2&3), 201-317 (1989).

A. Rudin, "Measurement of Long-Chain Branch Frequency in Synthetic Polymers", Modern Methods of Polym. Characterization, (1991), pp. 103-112.

Th. G. Scholte, "Mark-Houwink Equation and GPC Calibration for Linear Short-Chain Branched Polyolefins, Including Polypropylene and Ethylene-Propylene Copolymers", Journal of Applied Polymer Science, vol. 29, 3763-3782 (1984).

B.H. Zimm, "The Dimensions of Chain Molecules Containing Branches and Rings", J. Chem. Phys., 17, 1301 (1949).

* cited by examiner

LONG CHAIN BRANCHED PROPYLENE-ALPHA-OLEFIN COPOLYMERS

CROSS-REFERENCE TO RELATED APPLICATION

This application claims the benefit of U.S. Provisional Application No. 60/988,999, filed Nov. 19, 2007, which application is fully incorporated herein by reference. This application is a national stage entry of International Application No. PCT/US2008/082599, filed on Nov. 6, 2008, which application is fully incorporated herein by reference.

FIELD OF THE INVENTION

This invention relates to propylene polymers. In one aspect, the invention relates to propylene polymers having long chain branching (LCB) while another aspect, the invention relates to propylene polymers made in a high temperature, solution process using a catalyst composition comprising a Group 4 metal complex of a polyvalent aryloxyether.

BACKGROUND OF THE INVENTION

Propylene polymers, both homopolymers and copolymers, are well known in the art, and their methods of preparation and uses are many and varied. Depending upon, among other things, their compositional content (e.g., the nature and quantity of the monomer(s) from which the polymer is made), structure (e.g., the manner in which the units derived from the monomers arrange themselves into or onto a polymer chain), etc., the propylene polymer will have desirable or undesirable properties for a given application. One property, actually a combination of properties, important to processors of propylene polymers is processability, e.g., the shear thinning behavior and melt strength of the polymer in a melted state.

One class of propylene copolymers is that described in U.S. Pat. No. 6,525,157. These ethylene-propylene copolymers, when produced in the presence of a metallocene catalyst and an activator, in a single steady state reactor, show a balance of flexural modulus, tensile strength and elasticity. These copolymers are substantially free of diene-derived units, and exhibit softness, tensile strength and elasticity.

Another, more interesting class of propylene copolymers that exhibit a wide range of desirable properties is that described in U.S. Pat. No. 6,960,635. These polymers are characterized as comprising at least about 60 weight percent (wt %) of units derived from propylene, about 0.1-35 wt % of units derived from ethylene, and 0 to about 35 wt % of units derived from one or more unsaturated comonomers, with the proviso that the combined weight percent of units derived from ethylene and the unsaturated comonomer does not exceed about 40. These copolymers are also characterized as having at least one of the following properties: (i) $^{13}$C NMR peaks corresponding to a regio-error at about 14.6 and about 15.7 ppm, the peaks of about equal intensity, and (ii) a skewness index, $S_{ix}$, greater than about −1.20.

While the processability of these and other propylene polymers is good, a continuing interest in making it better exists, particularly with respect to shear thinning and melt strength. Increasing these attributes of processability increases the rate at which the polymer can be processed into film, fiber, extruded or injection molded articles and the like.

One method of increasing the processability of a polymer is through the use of additives, e.g., calcium stearate, a fluoroelastomer, etc. This method, however, simply adds to the expense of the process, and these additives can build-up on the extrusion surfaces of the processing equipment.

Another method is to introduce long chain branching into the structure of the polymer. While long chain branching in polypropylene is known, it is typically the result of post-polymerization modification of the polymer chain, e.g., subjecting the polypropylene to e-beam radiation, azide coupling, etc. To introduce long chain branching into the polypropylene backbone during polymerization usually requires the use of a diene or other chain extender. Polypropylene containing long chain branching as a result of in-reactor polymerization without the use of a chain extender, e.g., a diene, is not commercially practiced.

SUMMARY OF THE INVENTION

In one embodiment the invention is a substantially isotactic propylene interpolymer having long chain branching, and comprising (A) at least 60 weight percent (wt %) units derived from propylene, and (B) between greater than zero and 40 wt % units derived from ethylene, the propylene interpolymer further characterized by at least one of the following properties: (1) a g' ratio of less than 1, preferably less than 0.95, more preferably less than 0.85 and even more preferably less than 0.80, measured at interpolymer number average molecular weight (Mn), (2) a relative compositional drift of less than 50%, and (3) propylene chain segments having a chain isotacticity triad index of at least 70 mole percent. In another embodiment, the isotactic propylene interpolymer is characterized by at least two of properties (1), (2) and (3) and in another embodiment, the isotactic propylene interpolymer is characterized by properties (1), (2) and (3).

In other embodiments, the isotactic propylene interpolymers are further characterized at least one of (4) an intrinsic viscosity is less than 0.35 at a $\log_{10}$ weight average molecular weight of 5.5, and (5) a degree of strain hardening of between greater than 1.2 and 20. In one embodiment, the isotactic propylene interpolymers are characterized by both (4) and (5).

In other embodiments, the isotactic propylene interpolymers are further characterized by at least one of the following properties:
  (a) A weight average molecular weight (Mw) of at least 50,000 grams per mole (g/mol);
  (b) An Mw/Mn of less than 4;
  (c) A critical shear rate at the onset of surface melt fracture (OSMF) of at least 4,000 sec$^{-1}$;
  (e) An $I_{10}/I_2$ at 230° C. greater than or equal to ($\geqq$) 5.63;
  (f) A nominal weight percent crystallinity from greater than 0 to 40 wt %; and, preferably,
  (g) A single melting point as measured by differential scanning calorimetry (DSC).

In still another embodiment, the invention is a process of polymerizing propylene and at least one of ethylene and a $C_{4-30}$ α-olefin under continuous solution polymerization conditions in the presence of a catalyst composition comprising a hafnium complex of a polyvalent aryloxyether. The catalyst includes an activating cocatalyst, and the polymerization conditions typically include a temperature from 120 to 250° C. and a pressure from 100 kPa to 300 MPa. The process for making the propylene interpolymers of this invention does not require the use of a diene or other chain extender.

The propylene-interpolymers of this invention exhibit higher shear thinning behavior, higher melt strengths and improved processing as compared to propylene interpolymers of like composition and structure but without long chain branching. These improvements have commercial value in extrusion applications like blown and profile extrusion (e.g., improved bubble stability, improved shape retention and reduced surface melt fracture). These improvements allow for the processing of these polymers at higher production rates for extruded articles including film, fiber, sheet, tube and other shaped profiles. Other commercial applications include wire and cable (thermoplastic and crosslinked), blow-molding, biaxially oriented polypropylene (BOPP), Mono- and co-extruded blown films, mono- and co-extruded cast films, elastic non-woven fibers, mono-filament, and bi-component fibers and foams (both thermoplastic and crosslinked). Still other commercial applications for the propylene interpolymers of this invention include as a component in polyolefin dispersions, in blends with various polyethylenes (e.g., high density polyethylene), impact modification of various polymers, tie-layers in film structures (particularly after graft-functionalization), and as additives to and/or as blend components for various polymer compositions to improve one or more properties (e.g., paintability, softness, stiffness, etc.) of the compositions.

DETAILED DESCRIPTION OF THE PREFERRED EMBODIMENT

Figure 1:
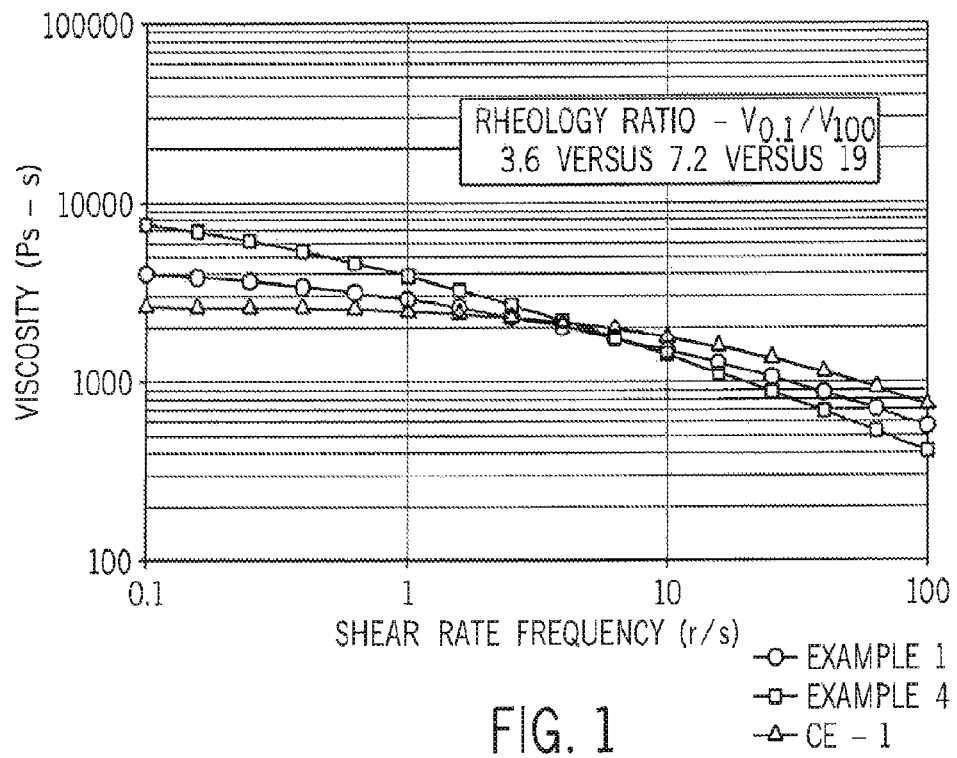
FIG. 1 is a log-log graph reporting dynamic mechanical rheology (DMS) comparisons between Comparative Example 1 and Inventive Examples 1 and 4.

All references to the Periodic Table of the Elements shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight and all test methods are current as of the filing date of this disclosure. For purposes of United States patent practice, the contents of any referenced U.S. patent, allowed U.S. patent application, or U.S. patent application publication are incorporated by reference.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, monomer content, melt flow rate, etc., is from 100 to 1.000, it is intended that all individual values, such as 100, 101, 102, etc., and sub ranges, such as 100 to 144, 155 to 170, 197 to 200, etc., are expressly enumerated. For ranges containing values that are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, ethylene content, long chain branching, isotacticity, molecular weight, melt flow rate and various process parameters.

The term "or", unless stated otherwise, refers to the listed members individually as well as in any combination.

As used with respect to a chemical compound, unless specifically indicated otherwise, the singular includes all isomeric forms and vice versa (for example, "hexane", includes all isomers of hexane individually or collectively). The terms "compound" and "complex" are used interchangeably to refer to organic-, inorganic- and organometal compounds. The term, "atom" refers to the smallest constituent of an element regardless of ionic state, that is, whether or not the same bears a charge or partial charge or is bonded to another atom. The term "heteroatom" refers to an atom other than carbon or hydrogen. Preferred heteroatoms include: F, Cl, Br, N, O, P, B, S, Si, Sb, Al, Sn, As, Se and Ge. The term "amorphous" refers to a polymer lacking a crystalline melting point as determined by differential scanning calorimetry (DSC) or equivalent technique.

The term, "hydrocarbyl" refers to univalent substituents containing only hydrogen and carbon atoms, including branched or unbranched, saturated or unsaturated, cyclic, polycyclic or noncyclic species. Examples include alkyl-, cycloalkyl-, alkenyl-, alkadienyl-, cycloalkenyl-, cycloalkadienyl-, aryl-, and alkynyl- groups. "Substituted hydrocarbyl" refers to a hydrocarbyl group that is substituted with one or more nonhydrocarhyl substituent groups. The terms, "heteroatom containing hydrocarbyl" or "heterohydrocarbyl" refer to univalent groups in which at least one atom other than hydrogen or carbon is present along with one or more carbon atoms and one or more hydrogen atoms. The term "heterocarbyl" refers to groups containing one or more carbon atoms and one or more heteroatoms, but without any hydrogen atoms. The bond between the carbon atom and any heteroatom as well as the bonds between any two heteroatoms, may be a single or multiple covalent bond or a coordinating or other donative bond. Thus, an alkyl group substituted with a heterocycloalkyl-, aryl-substituted heterocycloalkyl-, heteroaryl-, alkyl-substituted heteroaryl-, alkoxy-, aryloxy-, dihydrocarbylboryl-, dihydrocarbylphosphino-, dihydrocarbylamino-, trihydrocarbylsilyl-, hydrocarbylthio-, or hydrocarbylseleno- group is within the scope of the term heteroalkyl. Examples of specific heteroalkyl groups include cyanomethyl-, benzoylmethyl-, (2-pyridyl)methyl-, and trifluoromethyl- groups.

The term "aromatic" refers to a polyatomic, cyclic, conjugated ring system containing $(4\delta+2)$ $\pi$-electrons, wherein $\delta$ is an integer greater than or equal to 1. The term "fused" as used with respect to a ring system containing two or more polyatomic, cyclic rings means that with respect to at least two of its rings, at least one pair of adjacent atoms is included in both rings. The term "aryl" refers to a monovalent aromatic substituent which may be a single aromatic ring or multiple aromatic rings which are fused together, linked covalently, or linked to a common group such as a methylene or ethylene moiety. Examples of aromatic ring(s) include phenyl, naphthyl, anthracenyl, and biphenyl, among others.

"Substituted aryl" refers to an aryl group in which one or more hydrogen atoms bound to any carbon is replaced by one or more functional groups such as alkyl, substituted alkyl, cycloalkyl, substituted cycloalkyl, heterocycloalkyl, substituted heterocycloalkyl, halogen, alkylhalo (for example, $CF_3$), hydroxy, amino, phosphido, alkoxy, amino, thio, nitro, and both saturated and unsaturated cyclic hydrocarbons which are fused to the aromatic ring(s), linked covalently or linked to a common group such as a methylene or ethylene moiety. The common linking group may also be a carbonyl as in benzophenone, or oxygen as in diphenylether, or nitrogen as in diphenylamine.

"Blend," "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

The term "polymer" refers to a macromolecular compound prepared by polymerizing one or more monomers. A polymer refers to homopolymers, copolymers, terpolymers, interpolymers, and so on. The term "interpolymer" is used interchangeably with the term copolymer to refer to polymers incorporating in polymerized form at least two different copolymerizable monomers. The least prevalent monomer or monomers in the resulting interpolymer are generally referred to by the term "comonomer". The chain length of the resulting long chain branches referred to above, is consequently longer than the carbon length resulting from polymerization of any deliberately added comonomer, and in particular, is longer than 1 carbon for propylene/ethylene copolymers. The presence of long chain branching may also be detected by the increased shear sensitivity of the polymer, as disclosed in EP-A-608,369, and elsewhere, or determined by Melt index Ratio (MIR), a ratio of polymer melt viscosities measured under differing loads, especially $I_{10}/I_2$.

Differential scanning calorimetry (DSC) is a common technique that can be used to examine the melting and crystallization of semi-crystalline polymers. General principles of DSC measurements and applications of DSC to studying semi-crystalline polymers are described in standard texts (fur instance, E. A. Turi, ed., "Thermal Characterization Polymeric Materials", Academic Press, 1981).

The term "crystallinity" refers to the regularity of the arrangement of atoms or molecules forming a crystal structure. Polymer crystallinity can be examined using DSC. $T_{me}$ means the temperature at which the melting ends and $T_{max}$ means the peak melting temperature, both as determined by one of ordinary skill in the art from DSC analysis using data from the final heating step. One suitable method for DSC analysis uses a model Q1000™ DSC from TA Instruments, Inc. Calibration of the DSC is performed in the following manner. First, a baseline is obtained by heating the cell from −90° C. to 290° C. without any sample in the aluminum DSC pan. Then 7 milligrams of a fresh indium sample is analyzed by heating the sample to 180° C., cooling the sample to 140° C. at a cooling rate of 10° C./min followed by keeping the sample isothermally at 140° C. for 1 minute, followed by heating the sample from 140° C. to 180° C. at a heating rate of 10° C./min. The heat of fusion and the onset of melting of the indium sample are determined and checked to be within 0.5° C. from 156.6° C. for the onset of melting and within 0.5 J/g from 28.71 J/g for the heat of fusion. Then deionized water is analyzed by cooling a small drop of fresh sample in the DSC pan from 25° C. to 30° C. at a cooling rate of 10° C./min. The sample is kept isothermally at 30° C. for 2 minutes and heated to 30° C. at a heating rate of 10° C./min. The onset of melting is determined and checked to be within 0.5° C. from 0° C.

Samples of polymer are pressed into a thin film at a temperature of 190° C. About 5 to 8 mg of sample is weighed out and placed in a DSC pan. A lid is crimped on the pan to ensure a closed atmosphere. The sample pan is placed in the DSC cell and then heated at a high rate of about 100° C./min to a temperature of about 30° C. above the polymer melt temperature. The sample is kept at this temperature for about 3 minutes. Then the sample is cooled at a rate of 10° C./min to −40° C., and kept isothermally at that temperature for 3 minutes. Consequently the sample is heated at a rate of 10° C./min. until melting is complete. The resulting enthalpy curves are analyzed for peak melt temperature, onset and peak crystallization temperatures, heat of fusion and heat of crystallization, $T_{me}$, $T_{max}$, and any other quantity of interest from the corresponding thermograms as described in U.S. Pat. No. 5,960,635. The factor that is used to convert heat of fusion into nominal weight percent crystallinity is 165 J/g=100 wt % crystallinity. With this conversion factor, the total crystallinity of a propylene-based copolymer (units: weight percent crystallinity) is calculated as the heat of fusion divided by 165 J/g and multiplied by 100 percent.

"Mer unit" means that portion of a polymer derived from a single reactant molecule. For example, a mer unit from ethylene has the general formula —CH2CH2—.

"Polypropylene" or "propylene polymer" means a polymer having at least half of its mer units derived from propylene. These include homopolymers of propylene as well as copolymers of propylene with one or more monomers with which it (I.e., propylene) is copolymerizable such as ethylene, 1-butene, 1-pentene, 1-hexene, 1-octene, one or more conjugated or non-conjugated diener, and combinations of two or more of these comonomers.

"Substantially isotactic propylene sequences" and similar terms mean that the sequences have an isotactic triad (mm) mole fraction measured by $^{13}C$ NMR of greater than about 0.70, preferably greater than about 0.80, more preferably greater than about 0.85 and most preferably greater than about 0.90. Isotactic triad measurements are well known in the art, and are described in, for example, U.S. Pat. No. 5,504,172 and WO 00/01745 that refer to the isotactic sequence in terms of a triad unit in the copolymer molecular chain determined by $^{13}$C NMR spectra. NMR spectra are determined as follows.

$^{13}$C NMR spectroscopy is one of a number of techniques known in the art for measuring comonomer incorporation into a polymer. An example of this technique is described for the determination of comonomer content for ethylene/α-olefin copolymers in Randall (Journal of Macromolecular Science, Reviews in Macromolecular Chemistry and Physics, C29 (2 & 3), 201-317 (1989)). The basic procedure for determining the comonomer content of an olefin interpolymer involves obtaining the $^{13}$C NMR spectrum under conditions where the intensity of the peaks corresponding to the different carbons in the sample is directly proportional to the total number of contributing nuclei in the sample. Methods for ensuring this proportionality are known in the art and involve allowance for sufficient time for relaxation after a pulse, the use of gated-decoupling techniques, relaxation agents, and the like. The relative intensity of a peak or group of peaks is obtained in practice from its computer-generated integral. After obtaining the spectrum and integrating the peaks, those peaks associated with the comonomer are assigned. This assignment can be made by reference to known spectra or literature, or by synthesis and analysis of model compounds, or by the use of isotopically labeled comonomer. The mole percent comonomer can be determined by the ratio of the integrals corresponding to the number of moles of comonomer to the integrals corresponding to the number of moles of all of the monomers in the interpolymer, as described in Randall, for example.

The data is collected using a Varian UNITY Plus 400 MHz NMR spectrometer, corresponding to a $^{13}$C resonance frequency of 100.4 MHz, Acquisition parameters are selected to ensure quantitative $^{13}$C data acquisition in the presence of the relaxation agent. The data is acquired using gated 1H decoupling, 4000 transients per data file, a 6 sec. pulse repetition delay, spectral width of 24,200 Hz and a file size of 32K data points, with the probe head heated to 130° C. The sample is prepared by adding approximately 3 mL of a 50/50 mixture of tetrachloroethane-d2/orthodichlorobenzene that is 0.025M in chromium acetylacetonate (relaxation agent) to 0.4 g sample in a 10 mm NMR tube. The headspace of the tube is purged of oxygen by displacement with pure nitrogen. The sample is dissolved and homogenized by heating the tube and its contents to 150° C. with periodic refluxing initiated by heat gun.

Following data collection, the chemical shifts are internally referenced to the mmmm pentad at 21.90 ppm. Isotacticity at the triad level (mm) is determined from the methyl integrals representing the mm triad (22.5 to 21.28 ppm), the mr triad (21.28-20.40 ppm), and the rr triad (20.67-19.4 ppm). The percentage of mm tacticity is determined by dividing the intensity of the mm triad by the sum of the mm, mr, and rr triads. For propylene-ethylene copolymers, the integral regions are corrected for ethylene and regio-error by subtracting the contribution using standard NMR techniques, once the peaks have been identified. This can be accomplished, for example, by analyzing a series of copolymers of various levels of monomer incorporation, by literature assignments, by isotopic labeling, or other means which are known in the art.

"Polymerization conditions" generally refer to temperature, pressure, monomer content (including comonomer concentration), catalyst concentration, cocatalyst concentration, monomer conversion, polymer (or solids) content of the reaction mixture or other conditions that influence the properties of the resulting polymer. By operation according to the prescribed polymerization conditions of the invention, high molecular weight polymers may be prepared with high catalyst activities, low cocatalyst usage, high monomer conversion, and high reactor solids content in particular, activities (based on weight of polymer to weight of transition metal) greater than 0.5, preferably greater than 0.55 and even greater than 0.6, grams per microgram (g/μg) are possible.

The propylene interpolymers of this invention are characterized as comprising (A) between 60 and less than 100, preferably between 80 and 99 and more preferably between 85 and 99, wt % units derived from propylene, and (B) between greater than zero and 40, preferably between 1 and 20, more preferably between 4 and 16 and even more preferably between 4 and 10, wt % units derived from at least one of ethylene and/or a $C_{4-30}$ α-olefin, propylene interpolymer containing an average of at least 0.001, preferably an average of at least 0.005 and more preferably an average of at least 0.01, long chain branches/1000 total carbons. The maximum number of long chain branches in the propylene interpolymer is not critical to the definition of this invention, but typically it does not exceed 3 long chain branches/1000 total carbons.

Suitable $C_{4-30}$ α-olefins that can be used in the practice of this invention include, but are not limited to, isobutylene, 1-butene, 1-pentene, 1-hexene, 1-heptene, 1-octene, 1-nonene, 1-decene, 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, and vinylcyclohexane.

The term "linear" as here used means that the propylene polymer does not have long chain branching. That is, the polymer chains comprising the bulk linear propylene polymer have an absence of long chain branching, as for example the traditional random propylene polymers made using Ziegler-Natta polymerization processes (e.g., U.S. Pat. No. 4,612,300).

The term "backbone" is used in reference to a discrete molecule, and the term "polymer" or "bulk polymer" is used in the conventional sense to refer to the polymer as formed in a reactor. For a polymer to be considered as having long chain branching, the polymer must have at least enough molecules with long chain branching such that the average long chain branching in the bulk polymer is at least an average of 0.001 long chain branches/1000 total carbons (including both backbone and branch carbons).

The term "bulk polymer" means the polymer which results from a polymerization process, and it includes molecules having both an absence of long chain branching as well as molecules having long chain branching. Thus a "bulk polymer" includes all molecules formed during polymerization. For propylene interpolymers containing long chain branching, not all molecules will have long chain branching but a sufficient number of molecules will have long chain branching such that the average long chain branching content of the bulk polymer positively affects the melt rheology (i.e., the melt fracture properties).

As noted above, long chain branching (LCB) means a chain length greater than that resulting from the incorporation of the comonomer into the polymer backbone. Short chain branching (SCB) means a chain length of two (2) carbons less than the number of carbons in the comonomer. For example, a propylene/1-octene interpolymer of this invention has backbones with long chain branches of at least seven (7) carbons in length, but these backbones also have short chain branches of only six (6) carbons in length in contrast, a propylene/1-hexene interpolymer of this invention will have long chain branches of at least five (5) carbons in length but short chain branches of only four (4) carbons in length.

U.S. Pat. No. 4,500,648 teaches that long chain branching (LCB) frequency can be represented by the equation LCB=b/Mw wherein b is the weight average number of long chain branches per molecule and Mw is the weight average molecular weight. The molecular weight averages and the long chain branching characteristics are determined by gel permeation chromatography and intrinsic viscosity methods.

As suggested earlier, the presence of long chain branching can be determined in propylene/ethylene copolymers by a number of different methods using $^{13}$C nuclear magnetic resonance (NMR) spectroscopy and is quantified using the method described by Randall (Rev. Macromol. Chem. Phys., C29, V. 2&3, p. 285-297).

As a practical matter, conventional $^{13}$C NMR spectroscopy cannot determine the length of a long chain branch in excess of six carbon atoms. However, there are other known techniques useful for determining the presence of long chain branches in propylene/ethylene interpolymers. Two such methods are gel permeation chromatography coupled with a low angle laser light scattering detector (GPC-LALLS) and gel permeation chromatography coupled with a differential viscometer detector (GPC-DV). The use of these techniques for long chain branch detection and the underlying theories have been well documented in the literature. See, for example, Zimm, G. H. and Stockmayer, W. H., J. Chem. Phys., 17, 1301 (1949) and Rudin, A., Modern Methods of Polymer Characterization, John Wiley & Sons, New York (1991) pp. 103-112.

The triple detector GPC method for quantifying long chain branching, in polyolefins is clearly described by Wood-Adams, Paula M.; Dealy, John M.; deGroot, A. Willem; Redwine, O. David, in *Effect of Molecular Structure on the Linear Viscoelastic Behavior of Polyethylene*, Macromolecules (2000), 33(20), 7489-7499. This coupled with the technique described by Scholte et al in *Journal of Applied Polymer Science*, Vol. 29, 3763-3782 (1984) teaches one skilled in the art how to make a simple correction for randomly branched copolymers.

The propylene interpolymers of this invention are further characterized as having a resistance to melt fracture. An apparent shear stress versus apparent shear rate plot is used to identify the melt fracture phenomena. According to Ramamurthy in the Journal of Rheology, 30(2), 337-357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular film gloss to the more severe form of "sharkskin." The onset of surface melt fracture (OSMF) is characterized at the beginning of losing extrudate gloss at which the surface roughness of the extrudate can be detected by 40 times magnification.

The propylene interpolymers are further characterized as having an $I_{10}/I_2$ at 230° C. (as determined by ASTM D-1238) as greater than or equal to ($\geqq$) 5.63, preferably from 6.5 to 15, and more preferably from 7 to 10. The molecular weight distribution (Mw/Mn or MWD), measured by gel permeation chromatography (GPC), is defined by the equation: Mw/Mn$\leqq$($I_{10}/I_2$)-4.63, and is preferably between 1.5 and 2.5. The molecular weight distribution is typically and preferably unimodal. The $I_{10}/I_2$ ratio indicates the degree of long chain branching, i.e. the larger the $I_{10}/I_2$ ratio, the more long chain branching in the polymer.

The propylene interpolymers of this invention have a highly unexpected flow property, where the $I_{10}/I_2$ value at 230° C. of the polymer is essentially independent of the polydispersity index (i.e., Mw/Mn) of the polymer. This is contrasted with linear polypropylene resins having rheological properties such that to increase the $I_{10}/I_2$ value, the polydispersity index must also be increased.

The weight average molecular weight (Mw) of the propylene interpolymers of this invention is typically at least 50,000, more typically at least 100,000 and even more typically at least 200,000, grams per mole (g/mol). The maximum Mw can vary with a host of variables, e.g., polymerization conditions, comonomers, chain transfer agents, etc., but typically the maximum does not exceed 1,000,000, more typically it does not exceed 750,000 and even more typically it does not exceed 500,000, g/mol.

The polydispersity or molecular weight distribution (MWD or Mw/Mn) of the propylene interpolymers of this invention is typically less than 4, more typically less than 3.5, even more typically less than 3 and still more typically less than 2.8. The density of these polymers (as determined by ASTM D-792-00, Method B) is typically between 0.85 and 0.90, more typically between 0.855 and 0.895 and even more typically between 0.86 and 0.89, grams per cubic centimeter (g/cc).

The substantially isotactic propylene interpolymers of this invention exhibit a degree of strain hardening of between greater than 1.2 and 20. In one embodiment, the degree of strain hardening is preferably at least 1.5, more preferably at least 1.9 and still more preferably at least 2.0. In another embodiment, the maximum degree of strain hardening is preferably less than 15 and more preferably less than 10. Strain hardening is determined by the procedure described in the Specific Embodiments.

Polymer weight-average molecular weight ($M_w$) is measured by gel permeation chromatography (GPC), one technique of which as described in U.S. Pat. No. 5,272,236. Alternatively, melt index, $I_2$, $I_{10}$ or $I_{21}$, measured, for example, according to ASTM D-1238 at 230° C., may be employed as an indication of molecular weight. Generally, melt index is inversely related to the molecular weight of the polymer. The higher the molecular weight, the lower the melt index, although the relationship is not necessarily linear. Monomer conversion is typically measured by gas chromatography (GC) or infrared (IR) spectroscopic analysis of the reaction mixture exiting the reactor using a probe inserted into the reactor or into an effluent stream from the reactor.

The catalysts used to make the polymers of this invention are hafnium metal complexes of a polyvalent aryloxyether. These catalysts impart long chain branching to the polymers, and exhibit high activity and good stability at high temperatures. These catalysts comprise a Group 4 metal, preferably hafnium, complexed with an aryloxyether ligand and activated with an activator or cocatalyst. The metal complexes are capable of producing polymers from propylene containing monomer mixtures having extremely high molecular weight and isotacticity, at catalyst efficiencies of greater than 0.5 $g_{polymer}/\mu g_{metal}$ thus allowing the use of a chain transfer agent to control molecular weight without sacrificing molecular weight distribution. A sufficient quantity of chain transfer agent is preferably used so that a substantial decrease in molecular weight (>30 percent) occurs compared to a comparative polymerization without the use of chain transfer agent. When the chain transfer agent is hydrogen, at least 0.01 mol percent (based on propylene) is used, and a maximum of about 2 mol percent is used. Highly isotactic polymers can be prepared with high levels of chain transfer agents, while still affording narrow molecular weight distribution polymers and using low levels of alumoxane activators. Generally, use of high levels of chain transfer agent with more conventional catalysts results in production of polymers having broadened molecular weight distributions.

The metal complexes are activated in various ways to yield catalyst compounds having a vacant coordination site that will coordinate, insert, and polymerize addition polymerizable monomers, especially olefin(s). For the purposes of this patent specification and appended claims, the term "activator" or "cocatalyst" means any compound or component or method which can activate the metal complex in the foregoing manner. Non-limiting examples of suitable activators include Lewis acids, non-coordinating ionic activators, ionizing activators, organometallic compounds, and combinations of the foregoing substances capable of converting the neutral metal complex to a catalytically active species.

In one embodiment of the invention, catalyst activation may involve formation of a cationic, partially cationic, or zwitterionic species, by means of proton transfer, oxidation, or other suitable activation process. The present invention is operable and fully enabled regardless of whether or not such an identifiable cationic, partially cationic, or zwitterionic species actually results during the activation process, also known as an "ionization" process or "ionic activation process".

Ionizing cocatalysts may contain an active proton, or some other cation associated with, but not coordinated to or only loosely coordinated to, an anion of the ionizing compound. Such compounds are described in European publications EP-A-570982, EP-A-520732, EP-A-495375, EP-A-500944, EP-A-277 003 and EP-A-277004, and U.S. Pat. Nos. 5,153,157, 5,198,401, 5,066,741, 5,206,197, 5,241,025, 5,384,299 and 5,502,124. Preferred among the foregoing activators are ammonium cation containing salts, especially those containing trihydrocarbyl-substituted ammonium cations containing one or two $C_{10-40}$ alkyl groups, especially methylbis(octadecyl)-ammonium- and methylbis(tetradecyl)-ammonium- cations and a non-coordinating anion, especially a tetrakis(perfluoro)arylborate anion, especially tetrakis(pentafluorophenyl)borate. The cation may comprise a mixture of hydrocarbyl groups of differing lengths. For example, the protonated ammonium cation derived from the commercially available long-chain amine comprising a mixture of two $C_{14}$, $C_{16}$ or $C_{18}$ alkyl groups and one methyl group. Such amines are available from Chemtura Corp., under the trade name Kemamine™ T9701, and from Akzo-Nobel under the trade name Armeen™ M2HT. A most preferred ammonium salt activator is methyl di($C_{14-20}$ alkyl)ammonium tetrakis(pentafluorophenyl)borate.

Activation methods using ionizing ionic compounds not containing an active proton but capable of forming active catalyst compositions, such as ferrocenium salts of the foregoing non-coordinating anions, can also be used, and are described in EP-A-426637 EP-A-573403 and U.S. Pat. No. 5,387,568. Also included is the use of strong Lewis acids, especially tris(perfluoro)aryl borane compounds, such as tris(pentafluorophenyl)borane, which are capable of abstraction of ligand groups, especially a hydrocarbyl ligand, thus forming a non-coordinating counter anion for the cationic derivative of the metal complex.

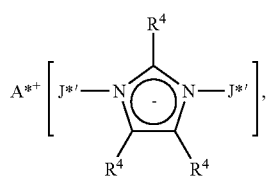

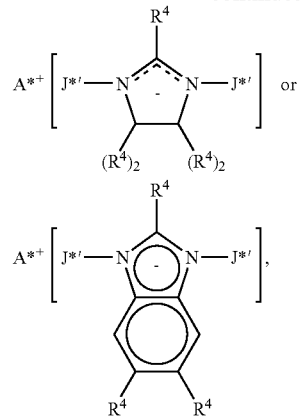

wherein:

$A^{*+}$ is a cation, especially a proton containing cation, and preferably is a trihydrocarbyl ammonium cation containing one or two $C_{10-40}$ alkyl groups, especially a methyldi($C_{14-20}$ alkyl)ammonium- cation, $R^4$, independently each occurrence, is hydrogen or a halo, hydrocarbyl, halocarbyl, halohydrocarbyl, silylhydrocarbyl, or silyl, (including mono-, di- and tri(hydrocarbyl)silyl) group of up to 30 atoms not counting hydrogen, preferably $C_{1-20}$ alkyl, and $J^{*\prime}$ is tris(pentafluorophenyl)borane or tris(pentafluorophenyl)alumane).

Examples of these catalyst activators include trihydrocarbylammonium- salts, especially, methyldi($C_{14-20}$)alkyl)ammonium salts of:

bis(tris(pentafluorophenyl)borane)imidazolide,
bis(tris(pentafluorophenyl)borane)-2-undecylimidazolide,
bis(tris(pentafluorophenyl)borane)-2-heptadecylimidazolide,
bis(tris(pentafluorophenyl)borane)45-bis(undecyl)imidazolide,
bis(tris(pentafluorophenyl)borane)-4,5-bis(heptadecyl)imidazolide,
bis(tris(pentafluorophenyl)borane)imidazolinide,
bis(tris(pentafluorophenyl)borane)-2-undecylimidazolinide,
bis(tris(pentafluorophenyl)borane)-2-heptadecylimidazolinide,
bis(tris(pentafluorophenyl)borane)-4,5-bis(undecyl)imidazolinide,
bis(tris(pentafluorophenyl)borane)-4,5-bis(heptadecyl)imidazolinide,
bis(tris(pentafluorophenyl)borane)-5,6-dimethylbenzimidazolide,
bis(tris(pentafluorophenyl)borane)-5,6-bis(undecyl)benzimidazolide,
bis(tris(pentafluorophenyl)alumane)imidazolide,
bis(tris(pentafluorophenyl)alumane)-2-undecylimidazolide,
bis(tris(pentafluorophenyl)alumane)-2-heptadecylimidazolide,
bis(tris(pentafluorophenyl)alumane)-4,5 bis(undecyl)imidazolide,
bis(tris(pentafluorophenyl)alumane)-4,5-bis(heptadecyl) imidazolide,
bis(tris(pentafluorophenyl)alumane)imidazolinide,
bis(tris(pentafluorophenyl)alumane)-2-undecylimidazolinide,
bis(tris(pentafluorophenyl)alumane)-2-heptadecylimidazolinide, bis(tris(pentafluorophenyl)alumane)-4,5-bis(undecyl)imidazolinide,
bis(tris(pentafluorophenyl)alumane)-4,5-bis(heptadecyl) imidazolinide,
bis(tris(pentafluorophenyl)alumane)-5,6-dimethylbenzimidazolide, and
bis(tris(pentafluorophenyl)alumane)-5,6-bis(undecyl)benzimidazolide.

Other activators include those described in PCT publication WO 98/07515 such as tris(2,2',2"-nonafluorobiphenyl) fluoroaluminate. Combinations of activators are also contemplated by the invention, for example, alumoxanes and ionizing activators in combinations, see for example, EP-A-0 573120, PCT publications WO 94/07928 and WO 95/14044 and U.S. Pat. Nos. 5,153,157 and 5,453,410. WO 98/09996 describes activating catalyst compounds with perchlorates, periodates and iodates, including their hydrates, WO 99/18135 describes the use of organoboroaluminum activators. EP-A-781299 describes using a silylium salt in combination with a non-coordinating compatible anion. Other activators or methods for activating a catalyst compound are described in for example, U.S. Pat. Nos. 5,849,852, 5,859,653, 5,869,723, EPA-615981, and PCT publication WO 98/32775.

Another suitable class of organometal activators or cocatalysts is alumoxanes, also referred to as alkylaluminoxanes. Alumoxanes are well known activators for use with metallocene type catalyst compounds to prepare addition polymerization catalysts. There are a variety of methods for preparing alumoxanes and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5.329,032, 5,248,801, 5,235,081, 5,157,137, 5,103,031, 5,391,793, 5,391,529, 5,693,838, 5,731,253, 5,731,451 5,744,656; European publications EP-A-561.476, EP-A-279586 and EP-A-594218; and PCT publication WO 94/10180. Preferred alumoxanes are Lewis acid modified alumoxanes, especially tri($C_{3-6}$)alkylaluminum modified methylalumoxane, including tri(isobutyl)aluminum modified methalumoxane, available commercially as MMAO-3A or tri(n-octyl)aluminum modified methalumoxane, available commercially as MMAO-12, from Akzo Nobel. Inc.

Within the scope of this invention is the use of a lumoxane(s) or modified alumoxane(s) as an activator or as a tertiary component in the invented process. That is, the compound may be used alone or in combination with other activators, either neutral or ionic, such as tri(alkyl)ammonium tetrakis(pentafluorophenyl)borate compounds, trisperfluoroaryl compounds, polyhalogenated heteroborane anions as disclosed in WO 98/43983, and combinations of two or more of these materials. When used as a tertiary component, the amount of alumoxane employed is generally less than that necessary to effectively activate the metal complex when employed alone in this embodiment, the alumoxane may not contribute significantly to actual catalyst activation. Notwithstanding the foregoing, some participation of the alumoxane in the activation process is not necessarily excluded.

Suitable alumoxanes include polymeric or oligomeric alumoxanes, especially methylalumoxane (MAO) as well as Lewis acid- modified alumoxanes, especially trihydrocarbylaluminum-, halogenated tri(hydrocarbyl)aluminum- or halogenated tri(hydrocarbyl)boron- modified alumoxanes, having from 1 to 10 carbons in each hydrocarbyl or halogenated hydrocarbyl group. Such activating cocatalysts are previously disclosed in, among other publications, U.S. Pat. Nos. 6,214,760, 6,160,146, 6,140,521, and 6,696,379. Preferred Lewis acid-modified alumoxane compounds are tri(i-butyl)aluminum-modified methalumoxane and tri(n-octyl)aluminum-modified methalumoxane containing from 10 to 30, preferably 15 to 25 mole percent i-butyl content and 10 to 20, preferably 12 to 18 mole percent n-octyl content, respectively, the molar percents based on total alkyl ligand content. The alumoxane or Lewis acid-modified alumoxane activator is preferably utilized in molar ratios cocatalyst:catalyst from 20-200, more preferably from 20-150, and most preferably from 20-80.

Because of the ability to be activated at relatively low levels of alumoxane or Lewis acid-modified alumoxane cocatalysts while maintaining high catalyst efficiency, the present hafnium complexes can achieve reduced levels of cocatalyst by-products in the resulting polymer along with long chain branch formation in the resulting polymer. This in turn allows the polymers to be employed in demanding applications such as those requiring high clarity or low dielectric constant.

In a preferred embodiment, the present process comprises polymerizing propylene and at least one of ethylene and a $C_{4-30}$ α-olefin using a hafnium metal complex and from 10 to 200 moles per mole of hafnium of an alumoxane, under continuous, solution polymerization conditions at a temperature from 120 to 250° C., preferably from 130 to 250° C., under high propylene conversion conditions (>75%, preferably >80%) to prepare a polymer comprising, in polymerized form, from 60 to less than 100, preferably 80 to 99 weight percent units derived from propylene, and greater than zero to 40, preferably 1 to 20, more preferably 4 to 16 and even more preferably 4 to 10, weight percent units derived from ethylene and/or a $C_{4-30}$ α-olefin.

In general, monomer conversion may be determined by measurement of the reactor contents or of a representative stream of effluent exiting the reactor. Suitable methods for determining monomer concentration include IR spectroscopy using a probe immersed in the reactor contents or a suitable sample of the contents. One suitable technique uses Fourier Transform Near-Infrared spectroscopy (FTNIR). Solids content of the reactor is calculated based on polymer (solids) produced, or it may also be measured directly by use of viscosity or density measurements of the reactor contents.

Multiple reactor polymerization processes may be suitably employed in the present invention. Examples include such systems as are disclosed in U.S. Pat. No. 3,914,342, among others. The multiple reactors can be operated in series or in parallel, with at least one catalyst composition according to the present invention employed in at least one of the reactors. One or both reactors may also contain at least two catalysts which have different comonomer incorporation capability and/or different molecular weight formation capability.

In one embodiment, a relatively high molecular weight product (Mw from 100,000 to over 1,000,000, more preferably 200,000 to 500,000) is formed while in the second reactor a product of a relatively low molecular weight (Mw 2,000 to 300,000) is formed. Both of these reactor products can have similar or different densities and/or elastomer content. The final product is a mixture of the two reactor effluents which are combined prior to devolatilization to result in a uniform mixing of the two or more polymer products (i.e., an in-reactor polymer blend).

In another embodiment, one reactor may be used to prepare a high molecular weight propylene homopolymer while the second reactor is employed to prepare a copolymer of propylene and ethylene and/or a $C_{4-30}$ α-olefin, or an interpolymer of propylene, ethylene and/or a $C_{4-30}$ α-olefin, and one or more dienes. Such a dual reactor process allows for the preparation of impact modified products or products with tailored properties. In one embodiment, the reactors are connected in series, that is, the effluent from the first reactor is charged to the second reactor and fresh monomer, solvent and/or hydrogen is optionally added to the second reactor. Reactor conditions are adjusted such that the weight ratio of polymer produced in the first reactor to that produced in the second reactor is ideally in the range from 5:95 to 95:5. The foregoing dual reactor process is capable of producing in-reactor polymer blends having broadened molecular weight distribution or polydispersity index (PDI). Preferred polymers made in the foregoing manner have PDI from 2.8 to 10.0, more preferably from 3.0 to 7.0.

In a further embodiment, one of the reactors in the polymerization process, including the first of two reactors operating in series, contains a heterogeneous Ziegler-Natta catalyst or a chromium containing catalyst, such as one of the numerous such catalysts known in the art. Examples of Ziegler-Natta catalysts include, but are not limited to, titanium-based catalysts supported on $MgCl_2$, and additionally comprise compounds of aluminum containing at least one aluminum-alkyl bond. Suitable Ziegler-Natta catalysts and their preparation include, but are not limited to, those disclosed in U.S. Pat. Nos. 4,612,300, 4,330,646 and 5,869,575. Suitable chromium based catalysts are those disclosed in, among other publications, U.S. Pat. Nos. 4,981,927, 4,835, 219, 4,564,660, 4,173,548 and 3,953,413.

Single reactor, multiple catalyst processes are also useful in the present invention. In one embodiment, two or more catalysts are introduced into a single reactor at the high monomer conversion conditions in which each catalyst inherently produces different polymer products. In one embodiment, a relatively high molecular weight product (Mw from 100,000 to over 1,000,000, more preferably 200,000 to 500,000) is formed from one catalyst while a product of a relatively low molecular weight (Mw 2,000 to 300,000) is formed from the other catalyst. Both of these catalyst compositions can have similar or different polymer formation ability, at least one of which comprises a metal complex as described below. The resulting polymer will have properties dependant on the ratio of the two catalysts that are employed in the single reactor. Suitable combinations of polymer molecular weight, comonomer incorporation ability, processes and ratios of catalysts for such products are disclosed in U.S. Pat. No. 6,924,342. Due to the unique compatibility of the present catalyst compositions with other olefin polymerization catalysts, including Ziegler/Natta catalysts, the second catalyst composition may comprise a metal complex as described below, a metallocene or other π-bonded ligand group-containing metal complex (including constrained geometry metal complexes), or a polyvalent heteroatom ligand group-containing metal complex, especially polyvalent pyridylamine or imidizolylamine based complexes and tetradendate oxygen-ligated biphenylphenol based Group 4 metal complexes.

Suitable metal complexes for use according to the present invention include compounds corresponding to the formula:

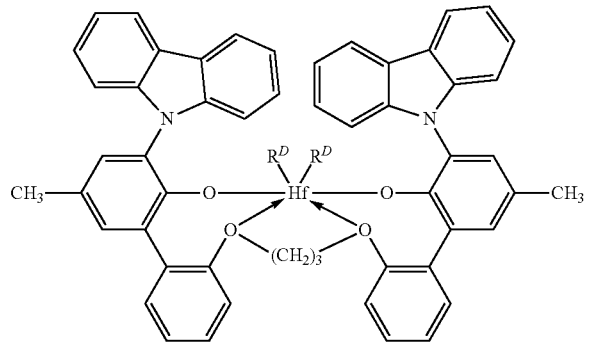

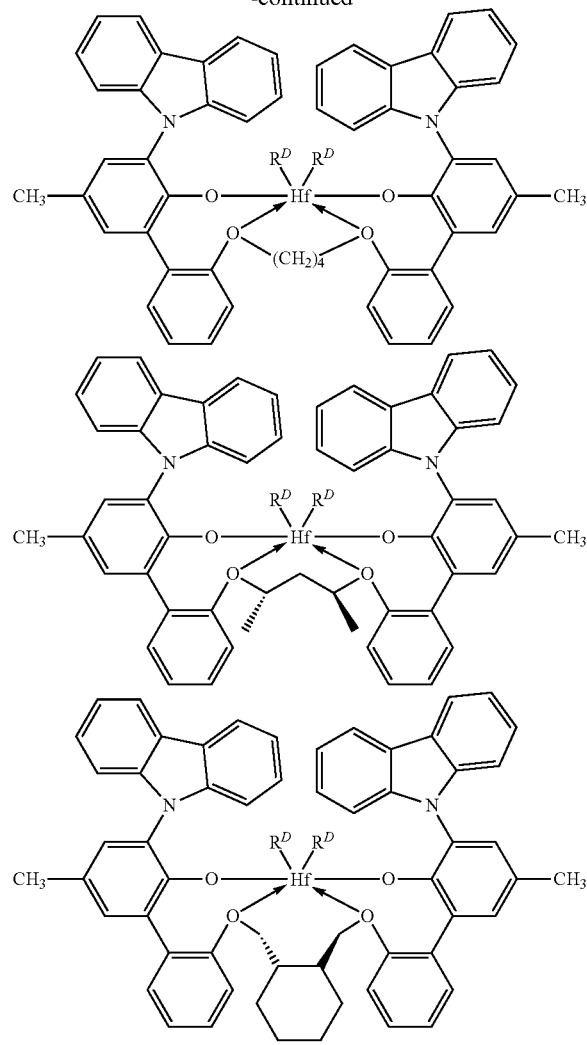

wherein, $R^D$ independently each occurrence is chloro, methyl or benzyl.

Specific examples of suitable metal complexes are the following compounds: bis((2-oxoyl-3-(dibenzo-1H-pyrrole-1-yl)-5-(methyl)phenyl)-2-phenoxy)-1,3-propanediylhafnium (IV) dimethyl, and bis((2-oxoyl-3-(dibenzo-1H-pyrrole-1-yl)-5-(methyl)phenyl)-2-phenoxymethyl)-methylenetrans-1, 2-cyclohexanediylhafnium (IV) dimethyl.

The foregoing metal complexes may be conveniently prepared by standard metallation and ligand exchange procedures involving a source of the transition metal and a neutral polyfunctional ligand source. The techniques employed are the same as or analogous to those disclosed in, among other publications, U.S. Pat. No. 6,827,976 and US2004/0010103.

The metal complex is activated to form the active catalyst composition by combination with the cocatalyst. The activation may occur prior to addition of the catalyst composition to the reactor with or without the presence of other components of the reaction mixture, or in situ through separate addition of the metal complex and activating cocatalyst to the reactor.

The polymers of the invention can be usefully employed in a variety of conventional thermoplastic fabrication processes to produce useful articles, including objects comprising at least one film layer, such as a monolayer film, or at least one layer in a multilayer film prepared by cast, blown, calendered or extrusion coating processes (exemplary films include greenhouse films, heat-seal film, shrink films including clarity shrink film, lamination film, biaxially-oriented film, extrusion coating, liners, clarity liners, over-wrap film and agricultural film); molded articles, such as blow molded, injection molded, or roto-molded articles; extrusions; fibers; and woven or non-woven fabrics. Monolayer and multilayer films may be made according to the film structures and fabrication methods described in U.S. Pat. No. 5,685,128. Thermoplastic compositions comprising the present polymers, include blends with other natural or synthetic polymers, additives, reinforcing agents, ignition resistant additives, antioxidants, stabilizers, colorants, extenders, crosslinkers, blowing agents, and plasticizers.

Of particular utility are multi-component fibers such as core/sheath fibers, having an outer surface layer, comprising at least in part, one or more polymers of the invention. Fibers that may be prepared from the present polymers or blends include staple fibers, tow, multi-component, sheath/core, twisted and monofilament. Suitable fiber forming processes include spun-bonded, melt blown techniques as disclosed in U.S. Pat. Nos. 4,430,563, 4,663,220, 4,668,566 and 4,322,027, gel-spun fibers as disclosed in U.S. Pat. No. 4,413,110, woven and nonwoven fabrics as disclosed in U.S. Pat. No. 3,485,706, or structures made from such fibers, including blends with other fibers, such as polyester, nylon or cotton, thermoformed articles, extruded shapes, including profile extrusions and co-extrusions, calendered articles, and drawn, twisted, or crimped yarns or fibers.

The polymers of this invention are also useful for wire and cable coating operations, as well as in sheet extrusion for vacuum forming operations, and forming molded articles, including the use of injection molding, blow molding process, or roto-molding processes. Compositions comprising the olefin polymers can also be formed into fabricated articles such as those previously mentioned using conventional polyolefin processing techniques which are well known to those skilled in the an of polyolefin processing.

Dispersions (both aqueous and non-aqueous) can also he formed using the present polymers or formulations comprising the same. Frothed foams comprising the invented polymers can also be formed, as disclosed in PCT Application No. 2004/027593 filed Aug. 25, 2004. Other foams include high strength foam, soft foam, rigid foam, cross-linked foam, high strength foam for cushioning applications, and sound insulation foam.

Molding applications include injection molding; blow-molding; and extrusion molding, e.g., pipe, including potable water pipe and high pressure pipe. Exemplary molded articles include bottles, frozen food packages and various interior and exterior automobile parts; and thermoformed articles, especially cups and plates, trays and containers.

The polymers may also be crosslinked by any known means, such as the use of peroxide, electron beam, silane, azide or other cross-linking technique. The polymers can also be chemically modified, such as by grafting (for example by use of maleic anhydride (MAH), silanes, or other grafting agent), halogenation, amination, sulfonation or other chemical modification.

The polypropylene polymers of this invention can be blended with other polymers to form, among other things, useful fibers, films and molded articles. Suitable polymers for blending with the polypropylene polymers of this invention are commercially available from a variety of suppliers and include, but are not limited to, other polyolefins such as an ethylene polymer (e.g., low density polyethylene (LDPE), ULDPE, medium density polyethylene (MDPE), LLDPE, HDPE, homogeneously branched linear ethylene polymer, substantially linear ethylene polymer, graft-modified ethylene polymer, ethylene-styrene interpolymers, ethylene vinyl acetate interpolymer, ethylene acrylic acid interpolymer, ethylene ethyl acetate interpolymer, ethylene methacrylic acid interpolymer, ethylene methacrylic acid ionomer, and the like), olefin multi-block interpolymers, polycarbonate, polystyrene, conventional polypropylene (e.g., homopolymer polypropylene, polypropylene copolymer, random block polypropylene interpolymer and the like), thermoplastic polyurethane, polyamide, polylactic acid interpolymer, thermoplastic block polymer (e.g. styrene butadiene copolymer, styrene butadiene styrene triblock copolymer, styrene ethylene-butylene styrene triblock copolymer and the like), polyether block copolymer (e.g., PEBAX), copolyester polymer, polyester/polyether block polymers (e.g., HYTEL), ethylene carbon monoxide interpolymer (e.g., ethylene/carbon monoxide (ECO), copolymer, ethylene/acrylic acid/carbon monoxide (EAACO) terpolymer, ethylene/methacrylic acid/carbon monoxide (EMAACO) terpolymer, ethylene/vinyl acetate/carbon monoxide (EVACO) terpolymer and styrene/carbon monoxide (SCO)), polyethylene terephthalate (PET), chlorinated polyethylene, and the like and mixtures thereof, in other words, the propylene-ethylene (P-E) copolymers used in the practice of this invention can he a blend of two or more polyolefins, or a blend of one or more polyolefins with one or more polymers other than a polyolefin. If the P-E copolymer used in the practice of this invention is a blend of one or more polyolefins with one or more polymers other than a polyolefin, then the P-E copolymer comprises at least about 1, preferably at least about 50 and more preferably at least about 90, wt % of the total weight of the blend.

The olefin multi-block interpolymers that can be used as blend components in the practice of this invention are exemplified by the ethylene multi-block copolymers made with two catalysts incorporating differing quantities of comonomer, and these copolymers have a weight ratio of blocks from 95:5 to 5:95. Representative of these olefin multi-block interpolymers are the olefin multi-block interpolymers to be manufactured and sold by The Dow Chemical Company under the trademark INFUSE™.

The ethylene multi-block copolymers desirably have an ethylene content of from 20 to 90 percent, optionally a diene content of from 0,1 to 10 percent, and an alpha-olefin content of from 10 to 80 percent, based on the total weight of the polymer. Further preferably, the multi-block copolymers have an ethylene content of from 60 to 90 percent, a diene content of from 0.1 to 10 percent, and an alpha-olefin content of from 10 to 40 percent, based on the total weight of the polymer. Preferred polymers are high molecular weight polymers, having, a weight average molecular weight (Mw) from 10,000 to about 2,500,000, preferably from 20,000 to 500,000, more preferably from 20,000 to 350,000; a polydispersity less than 3.5, more preferably less than 3 and as low as about 2; and a Mooney viscosity (ML (1+4)125 C.) from 1 to 250. More preferably, such polymers have an ethylene content from 65 to 75 percent, a diene content from 0 to 6 percent, and an alpha-olefin content from 20 to 35 percent.

The ethylene multi-block copolymers also typically have a density of less than about 0.90, preferably less than about 0.89, more preferably less than about 0.885, even more preferably less than about 0.88 and even more preferably less than about 0.875, g/cc. The ethylene multi-block copolymers typically have a density greater than about 0.85, and more preferably greater than about 0.86, g/cc. Density is measured by the procedure of ASTM D-792. Low density ethylene multi-block copolymers are generally characterized as amorphous, flexible and having good optical properties, e.g., high transmission of visible and UV-light and low haze.

The ethylene multi-block copolymers useful in the practice of this invention typically have a melting point of less than about 125. The melting point is measured by the differential scanning calorimetry (DSC) method described in WO 2005/090427 (US2006/0199930). Ethylene multi-block copolymers with a low melting point often exhibit desirable flexibility and thermoplasticity properties useful in the fabrication of the modules of this invention.

The ethylene multi-block copolymers used in the practice of this invention, and their preparation and use, are more fully described in WO 2005/090427, US2006/0199931, US2006/0199930, US2006/0199914, US2006/0199912, US2006/0199911, US2006/0199910, US2006/0199908, US2006/0199907, US2006/0199906, US2006/0199905, US2006/0199897, US2006/0199896, US2006/0199887, US2006/0199884, US2006/0199872, US2006/0199744, US2006/0199030, US2006/0199006 and US2006/0199983.

The following examples further illustrate the invention. Unless otherwise noted, all parts and percentages are by weight.

Specific Embodiments

All of the inventive propylene-ethylene copolymers are produced using bis((2-oxoyl-3-(dibenzo-1H-pyrrole-1-yl)-5-(methyl)phenyl)-2-phenoxymethyl)-methylenetrans-1,2-cyclohexanediylhafnium (IV) dimethyl (Catalyst A). The comparative propylene-ethylene copolymers are commercially available and manufactured using [N-[2,6-bis(1-methylethyl)phenyl]-α-[2-(1-methylethyl)phenyl]-6-(1-naphthalenyl-κC2)-2-pyridine methanaminato(2-)-κN1,κN2]dimethylhafnium (Catalyst B).

The propylene-ethylene copolymers used in these examples are made according to the following procedure. The catalyst and cocatalyst component solutions are metered using pumps and mass flow meters and are combined with the catalyst flush solvent and introduced into the bottom of the reactor. The cocatalyst used is a long-chain alkyl ammonium borate of approximate stoichiometry equal to methyl di(octadecyl)ammonium tetrakis(pentafluorophenyl)borate (MDB) combined with a tertiary component, tri(isobutyl)aluminum modified methalumoxane (MMAO) containing a molar ratio of i-butyl/methyl groups of about 1/3. For Catalysts A and B, the cocatalyst is in a molar ratio based on Hf of 1.2/1, and MMAO (25/1 Al/Hf).

The polymerization process is exothermic. There are about 900 BTUs released per pound of propylene polymerized and about 1,500 BTUs released per pound of ethylene polymerized. The primary process design consideration is the removal of the heat of reaction. The propylene-ethylene (P-E) copolymers are produced in a low-pressure, solution polymerization loop reactor, made up of a 3 inch loop pipe plus two heat exchanges, the total volume of which is 31.4 gallons. Solvent and monomer (propylene) are injected into the reactor as a liquid. The comonomer (ethylene) gas is folly dissolved in the liquid solvent. The feed is cooled to 5° C. before injection into the reactor. The reactor operates at polymer concentration between 15 and 20 wt %. The adiabatic temperature rise of the solution accounts for some of the heat removal from the polymerization reaction. Heat exchangers within the reactor are utilized to remove the remaining heat of reaction allowing for reactor temperature control at the reaction temperatures (reported in the following tables).

The solvent used is a high purity iso-paraffinic fraction available from Exxon under the trademark Isopar E. Fresh propylene is passed through a bed of Selexsorb COS for purification before mixing with a recycle stream containing solvent, propylene, ethylene, and hydrogen. After mixing with the recycle stream, the combined stream is passed through a bed of 75 wt % Molecular Sieve 13X and 25 wt % Selexsorb CD for further purification before using a high pressure (700 psig) feed pump to pass the contents to the reactor. Fresh ethylene is passed through a Selexsorb COS bed for purification before compressing the stream to 750 psig. Hydrogen (a telogen used to reduce molecular weight) is mixed with the compressed ethylene before the two are mixed/dissolved into the liquid feed. The total stream is cooled to an appropriate feed temperature (5° C.). The reactor operates at 500-525 psig and the control temperature is reported in the Tables. The propylene conversion in the reactor is maintained by controlling the catalyst injection rate. The reaction temperature is maintained by controlling the water temperature across the shell side of the heat exchanger at 85° C. The residence time in the reactor is short (about 10 minutes). The propylene conversion per reactor pass is also reported in the tables.

Upon exiting the reactor, water and additive are injected into the polymer solution. The water hydrolyzes the catalyst, terminating the polymerization reaction. The additives consist of antioxidants, 500 ppm of a phenolic and 1000 ppm of a phosphite, which remain with the polymer and act as stabilizers to prevent polymer degradation while in storage before subsequent fabrication at an end-user's facility. The post-reactor solution is super-heated from reactor temperature to 230° C. in preparation for a two-stage devolatilization. The solvent and unreacted monomers are removed during the devolatilization process. The polymer melt is pumped to a die for underwater pellet cutting.

Solvent and monomer vapors exiting the top of the devolatilizers are sent to a coalescer. The coalescer removes polymer entrained in the vapor during devolatilization. The clean vapor stream leaving the coalescer is partially condensed through a series of heat exchangers. The two-phase mixture enters a separation drum. The condensed solvent and monomers are purified (this is the recycle stream described above) and re-used in the reaction process. The vapors leaving the separating drum, mostly containing propylene and ethylene are sent to a block fare and burned.

Each of the P-E copolymers of CE1 and Examples 1-4 contained about 5 wt % units derived from ethylene. The number average (Mn) and weight average (Mw) molecular weight values for these P-E copolymers are reported in Table 1B, and the g' ratios as well as other properties of these P-E copolymers are reported in Table 1C. These examples demonstrate, among other things, the higher shear thinning values for the inventive copolymers as compared to the commercially available copolymers. These data also demonstrate that higher shear thinning values are obtained as the reactor temperature is increased from 130 to 160° C.

TABLE 1A

Selected Reaction Conditions of the Manufacture of P-E Copolymers

| Example | I2 (230° C.) | I10/I2 (230° C.) | Density (g/cc) | Catalyst Type | Reaction Temp (° C.) | Propylene Conversion (%) |
|---|---|---|---|---|---|---|
| CE1 | 9 | 6.3 | 0.888 | B | 100 | 60 |
| 1 | 8.5 | 9.4 | 0.887 | A | 130 | 80 |
| 2 | 7.5 | 9.5 | 0.887 | A | 145 | 81 |

TABLE 1A-continued

Selected Reaction Conditions of the Manufacture of P-E Copolymers

| Example | I2 (230° C.) | I10/I2 (230° C.) | Density (g/cc) | Catalyst Type | Reaction Temp (° C.) | Propylene Conversion (%) |
|---|---|---|---|---|---|---|
| 3 | 7.0 | 11.7 | 0.888 | A | 155 | 79 |
| 4 | 7.3 | 14.6 | 0.887 | A | 165 | 80 |

TABLE 1B

Mn and Mw of the P-E Copolymers

| Example | Mn (GPC) | Mw (GPC) |
|---|---|---|
| CE1 | 76,000 | 189,000 |
| 1 | 72,000 | 203,000 |
| 2 | 77,000 | 216,000 |
| 3 | 62,000 | 209,000 |
| 4 | 61,000 | 225,000 |

TABLE 1C

Selected Properties of the P-E Copolymers

| Ex. | I2 (2.16 Kg/230° C.) | I10/I2 @230° C. | Density (g/cc) | g' Ratio @Mn | g' Ratio @Mw | Degree of Strain Hardening | Isotacticity (% mm) |
|---|---|---|---|---|---|---|---|
| CE1 | 9 | 6.3 | 0.888 | 1 | 1 | 1 | 97 |
| 1 | 8.5 | 9.4 | 0.887 | 0.93 | 0.98 | 1.9 | 96 |
| 2 | 7.5 | 9.5 | 0.887 | 0.95 | 0.96 | — | 96 |
| 3 | 7.0 | 11.7 | 0.888 | 0.81 | 0.9 | 4.6 | 96 |
| 4 | 7.3 | 14.6 | 0.887 | 0.74 | 0.95 | — | 96 |

Dynamic Mechanical Rheology:

Additional data for demonstrating the improved shear thinning behavior of the inventive polymers is based on dynamic mechanical rheology (DMS) data obtained at 190° C. melt temperature for the shear rate frequency range of 0.1 to 100 radians per second (r/s). Complex viscosity versus shear rate frequency data are shown in FIG. 1. These viscosity curves demonstrate the higher (improved) shear thinning behavior of the inventive P-E copolymers. The examples reported in FIG. 1 are further characterized using a Theology ratio value which is calculated from the viscosity at 0.1 r/s divided by the viscosity at 100 r/s. The rheology ratio values reflect the overall slope of the viscosity versus shear rate frequency curves and are analogous to the $I_{10}/I_2$ ratio. The P-E copolymers with higher rheology ratio values have higher (improved) shear thinning behavior.

Figure 2:
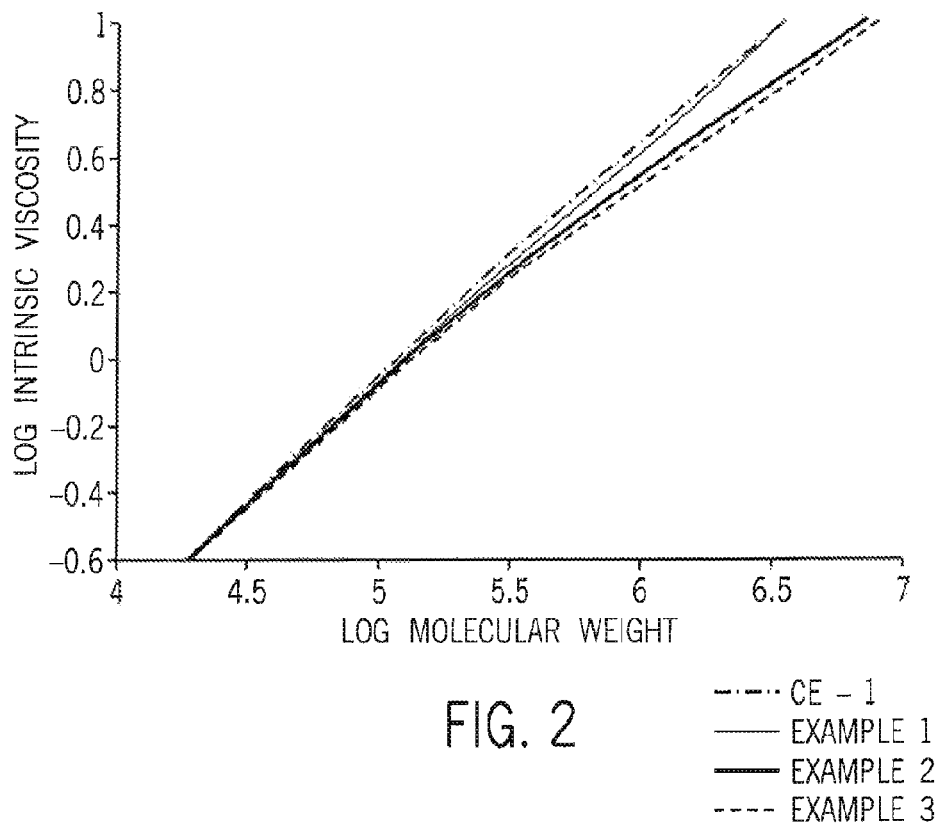
FIG. 2 is a Mark-Houwink plot of the log intrinsic viscosity against the log molecular weight of Comparative Example 1 and Inventive Examples 1-3

The lower viscosities at higher shear rates are due to the presence of long chain branching in the inventive P-E copolymers. The presence of long chain branching is indicated from the non-linear response of Mark-Houwink plots or curves. These data are shown in FIG. 2. For these data, a gel permeation chromatograph (GPC) equipped with triple detectors (laser light scattering, differential refractometer and viscometer) is utilized. The triple detector GPC method for quantifying long chain branching in polyolefins is clearly described by Wood-Adams, Paula M.; Dealy, John M.; deGroot, A. Willem; Redwine, O. David, in *Effect of Molecular Structure on the Linear Viscoelastic Behavior of Polyethylene*, Macromolecules (2000), 33(20), 7489-7499. This coupled with the technique described by Scholte et al in *Journal of Applied Polymer Science*, Vol. 29, 3763-3782 (1984) teaches one skilled in the art how to make a simple correction for randomly branched copolymers.

The g' ratio is the ratio of the intrinsic viscosity value for the branched propylene-ethylene copolymer divided by the intrinsic viscosity value for the linear propylene-ethylene copolymer having similar ethylene content, i.e., polymer density, and similar molecular weight, i.e., melt flow rate. "Similar" means within twenty percent (20%) of each value. These g' ratios are calculated at the number average molecular weight (Mn) and weight average molecular weight values (Mw). The g' values for the comparative example and the inventive examples are shown in Table 1C.

$$g'=(IV_{branched}/IV_{linear})$$

The IV values are obtained at Mn and Mw values.

Figure 3:
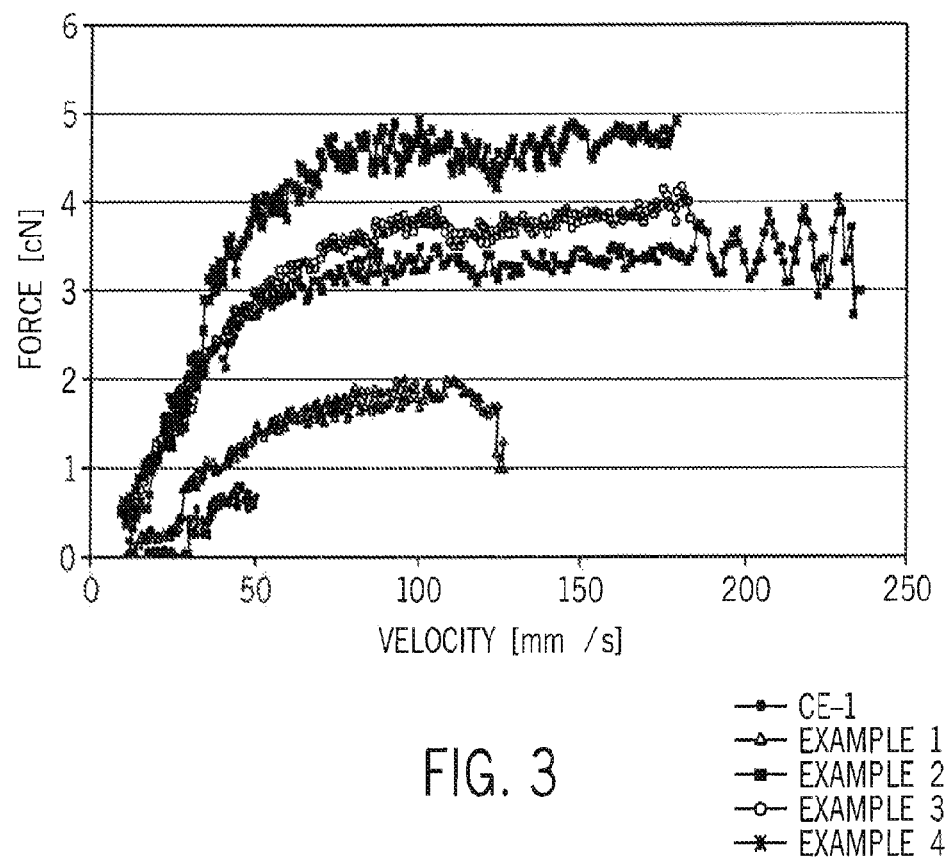
FIG. 3 is a graph reporting the melt strength data (force vs. velocity) of Comparative Example 1 and inventive Examples 1-4.

The examples are also characterized for melt strength at 190° C. This method utilizes a capillary rheometer equipped with a mechanical device that measures the force on the extruded molten strand as a function of linear velocity. These melt strength data are shown in FIG. 3. Higher melt strength values are indicated by higher force versus velocity values. The inventive P-E copolymers exhibit higher melt strength values as compared to the comparative P-E copolymer. The melt strength data for the inventive P-E copolymers are consistent with the higher $I_{10}/I_2$ values and higher rheology ratio values.

Extrusion Processing Comparisons

Figure 4A:
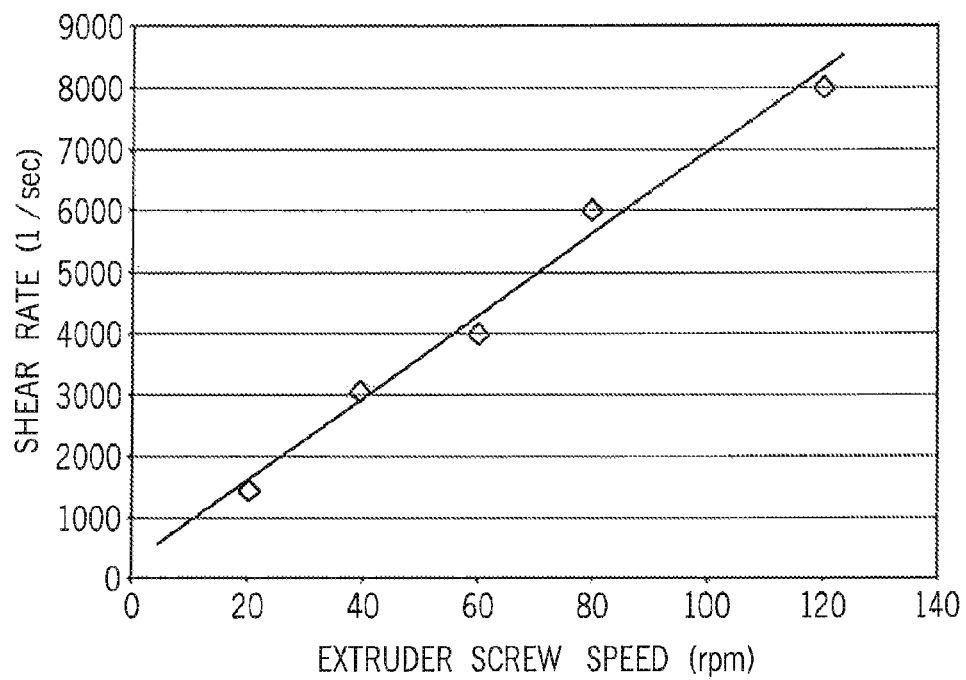
FIGS. 4A and 4B are graphs reporting extruder processing conditions (torque vs. screw speed) of Comparative Example 1 and Inventive Examples 1-3.
Figure 4B:
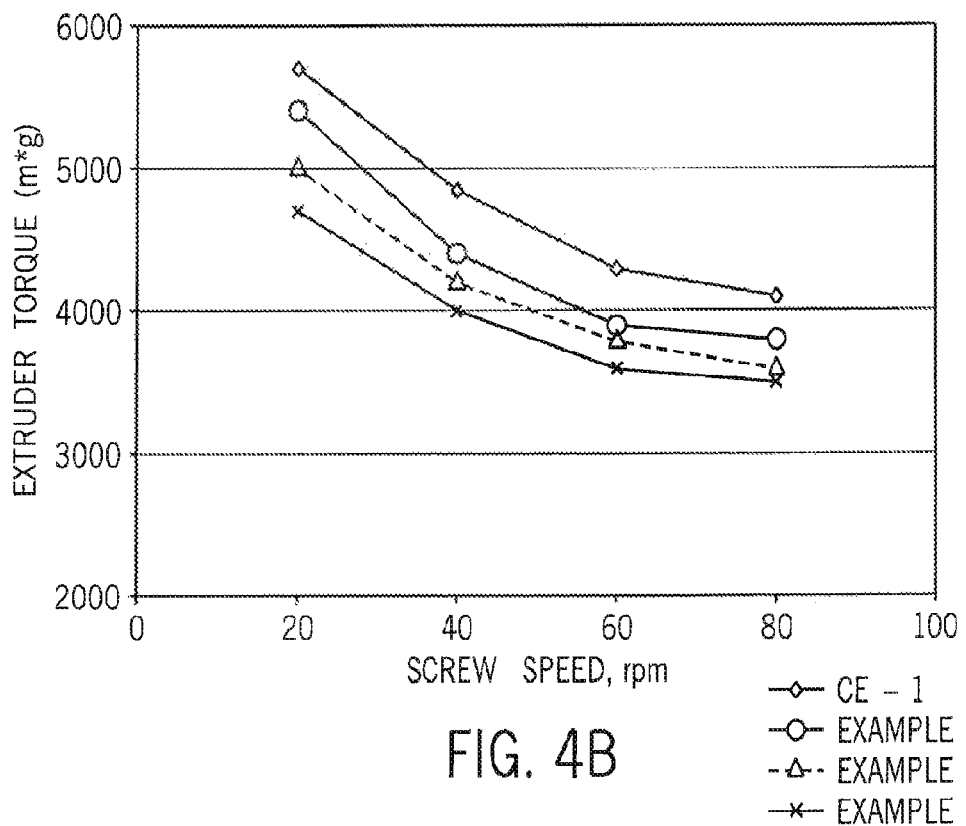

The Comparative and Inventive P-E copolymers reported in Table 1 are compared for melt processability using a Haake extruder and drive control unit. The extruder has a length: diameter (L/D) ratio of 24:1, an 18 millimeter (mm) diameter single screw equipped with a tube die having dimensions of 2.54 mm outer diameter (OD) and 1.78 mm inner diameter (ID). The die gap is 0.038 mm. The extrusion temperature is set at 130° C. The copolymers are melt extruded using the extruder and die at screw speeds of 20, 40, 60 and 80 revolutions per minute (rpm). FIG. 4A shows the shear rate versus screw speed (in revolutions per minute (rpm)) calibration curve. At 40 rpm the shear rate is 4,000 reciprocal seconds ($sec^{-1}$). At each screw speed, the extruder torque is monitored. At each screw speed, the surface quality of the extruded article (tube) is determined. The torque versus screw speed data is shown in FIG. 4B. These data show the improved processability of the inventive copolymers. In addition, for the comparative copolymer melt fracture is observed on the tube surface at a screw speed of 20 rpm. For the inventive copolymers, melt fracture is observed on the tube surface at 80 rpm. These melt fracture data also demonstrate the improved processability of the inventive copolymers.

The comparative and inventive copolymers reported in Table 2 are extruded into monolayer films using a blown film extrusion process. The equipment uses is a Glouchester blown film line equipped with a 6-inch die. The extruder is a 30:1 (L/D), 2.5 inch diameter, single-screw extruder equipped a barrier screw. The blown film extrusion conditions are shown in Table 3. The blown film thickness is controlled to a thickness of 0.051 mm (0.002 inch). For these extrusion conditions, melt fracture is observed on the blown film prepared from the comparative copolymers. Melt fracture is not observed on the blown film prepared from the inventive copolymers.

TABLE 2

Selected Properties of P-E Copolymers and Selected Reaction Conditions

| Ex. | I2 (230° C.) | I10/I2 (230° C.) | Density (g/cc) | Cat Type | React Temp (° C.) | Propyl Conv (%) | Ethyl (wt %) |
|---|---|---|---|---|---|---|---|
| CE2 | 2 | 11.3 | 0.888 | B | 105 | 60 | 5 |
| CE3 | 2 | 9.7 | 0.877 | B | 105 | 60 | 9 |
| 5 | 2 | 15.5 | 0.887 | A | 130 | 80 | 5 |
| 6 | 2 | 14.9 | 0.876 | A | 130 | 80 | 9 |

TABLE 3

Blown Film Extrusion Conditions

| Example | Screw Speed (rpm) | Die Set Temperature (° C.) | Melt Temperature (° C.) | Film Surface (Observation) |
|---|---|---|---|---|
| CE2 | 69 | 210 | 233 | Melt Fracture |
| CE3 | 55 | 210 | 230 | Melt Fracture |
| 5 | 59 | 210 | 221 | No Melt Fracture |
| 6 | 49 | 210 | 218 | No Melt Fracture |

More Extrusion Processing Comparisons

Figure 5:
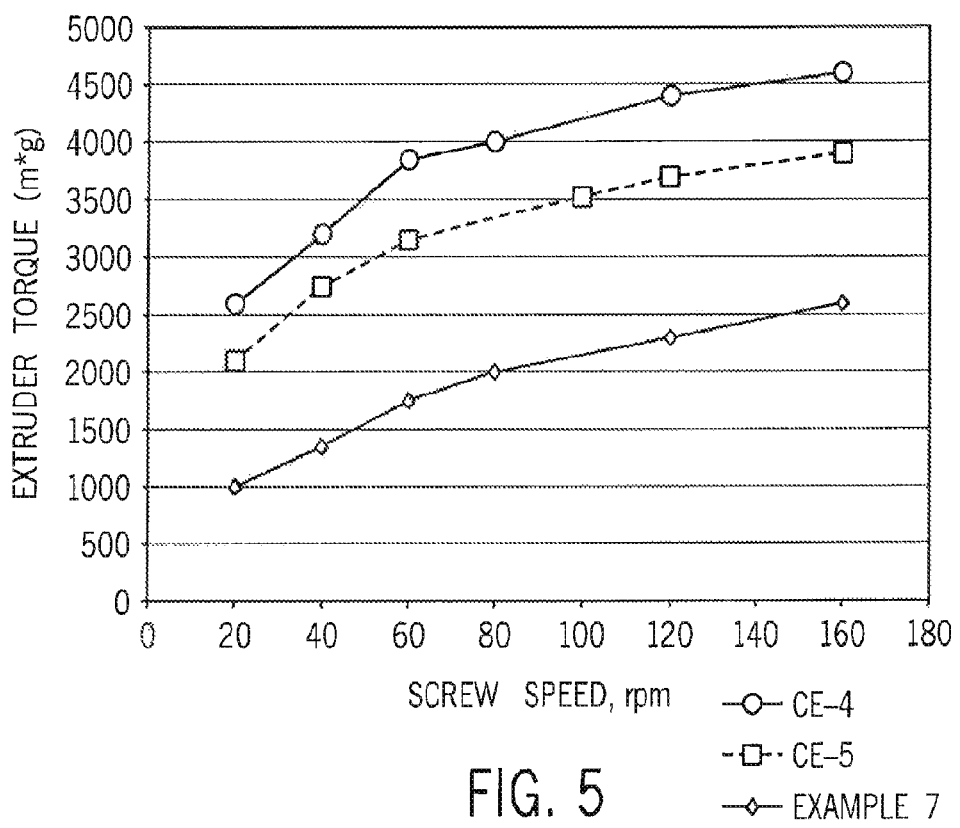
FIG. 5 is a graph reporting the extrusion performance (torque vs. screw speed) of Comparative Examples 4-5 and inventive Example 7.
Figure 6A:
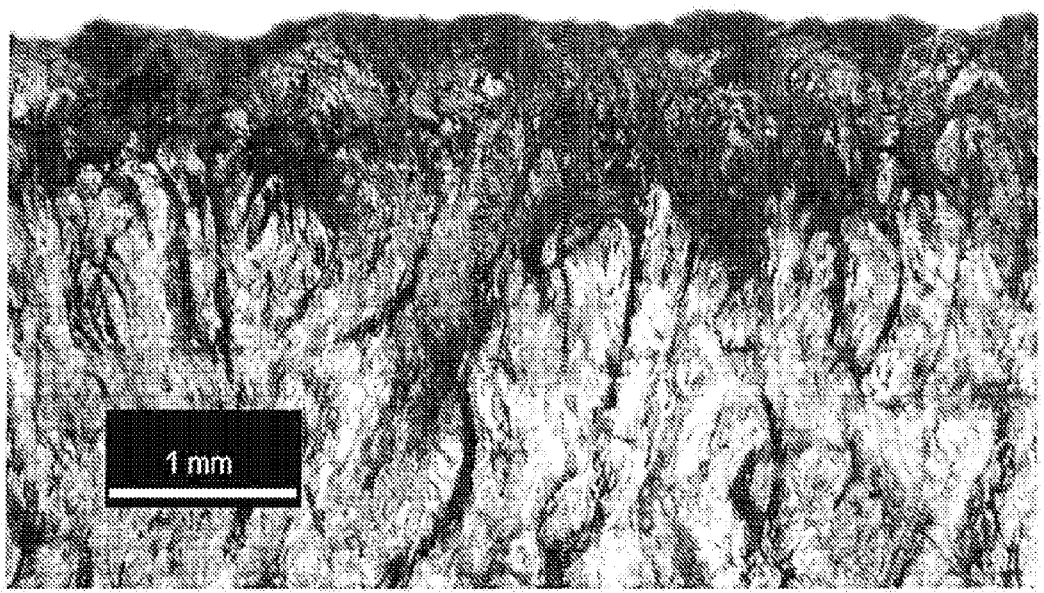
FIGS. 6A-6C are micrographs of the surface of tubing extruded from the polymers of Comparative Examples 4-5 and Inventive Example 7, respectively.
Figure 6B:
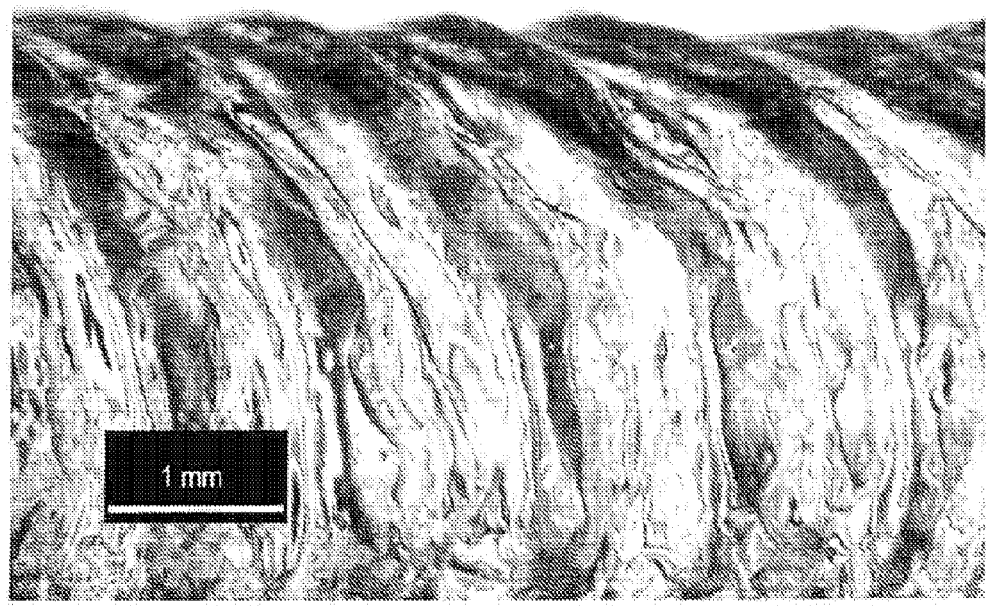
Figure 6C:
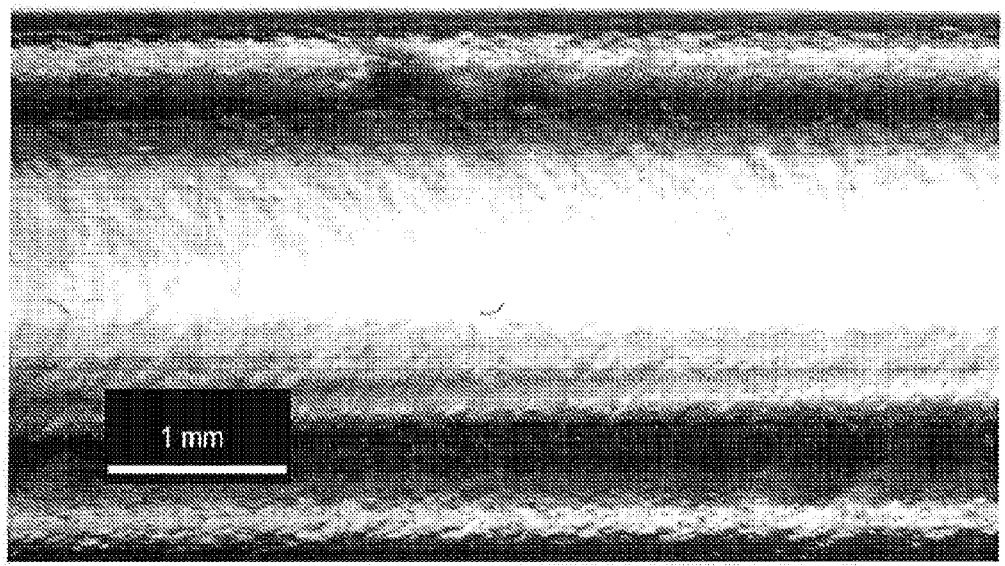

The Comparative and Inventive P-E copolymers reported in Table 4 are compared for melt processability using the Haake extruder and drive control unit described for the comparisons reported for the copolymers reported in Table 1. The extrusion temperature is set at 180° C. The copolymers are melt extruded using the extruder and die at screw speeds of 20, 40, 60, 80, 120 and 160 rpm. At each screw speed, the extruder torque is monitored. At each screw speed, the surface quality of the extruded article (tube) is determined. The torque versus screw speed data is shown in FIG. 5. These data show the improved processability of the inventive copolymers. In addition, for the comparative copolymers melt fracture is observed on the tube surface at a screw speed of 40 rpm and 180° C. (FIGS. 6A-6C). These melt fracture data also demonstrate the improved processability of the inventive copolymers.

TABLE 4

Selected Properties of P-E Copolymers and Selected Reaction Conditions

| Example | I2 (230° C.) | Density (g/cc) | Cat Type | React Temp (° C.) | Propyl Conv (%) | Ethyl (wt %) |
|---|---|---|---|---|---|---|
| CE4 (VISTAMAXX™ 6100) | 3 | 0.854 | — | — | — | 14 |
| CE5 (VISTAMAXX™ 3000) | 8 | 0.868 | — | — | — | 10 |
| 7 | 8 | 0.876 | A | 130 | 80 | 9 |

Long Term Pellet Blocking

The comparative and inventive copolymers of these blocking examples are described in Table 5. The ethylene-octene copolymer and the random polypropylene copolymer are added to the base polymer, melt blended and pelletized. The ethylene-octene copolymer has a density of 0.900 g/cc and a melt index ($I_2$ at 190° C. and 2.16 kg) of 6.0 g/10 min. The random polypropylene copolymer also has a density of 0.900 g/cc and a melt flow rate. ($I_2$ at 230° C. and 2.16 kg) of 7.0 g/10 min.

Figure 7A:
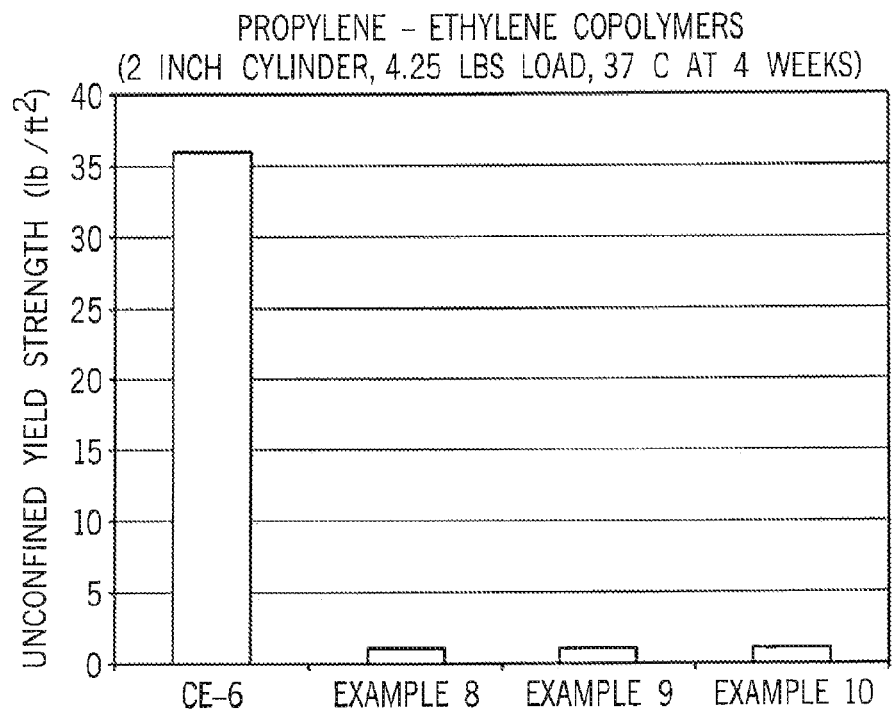
FIGS. 7A-7B are bar graphs reporting long term blocking (as unconfined yield strength) of Comparative Example 6 and inventive Examples 8-10, and Comparative Example 6 and inventive Examples 11-14, respectively.
Figure 7B:
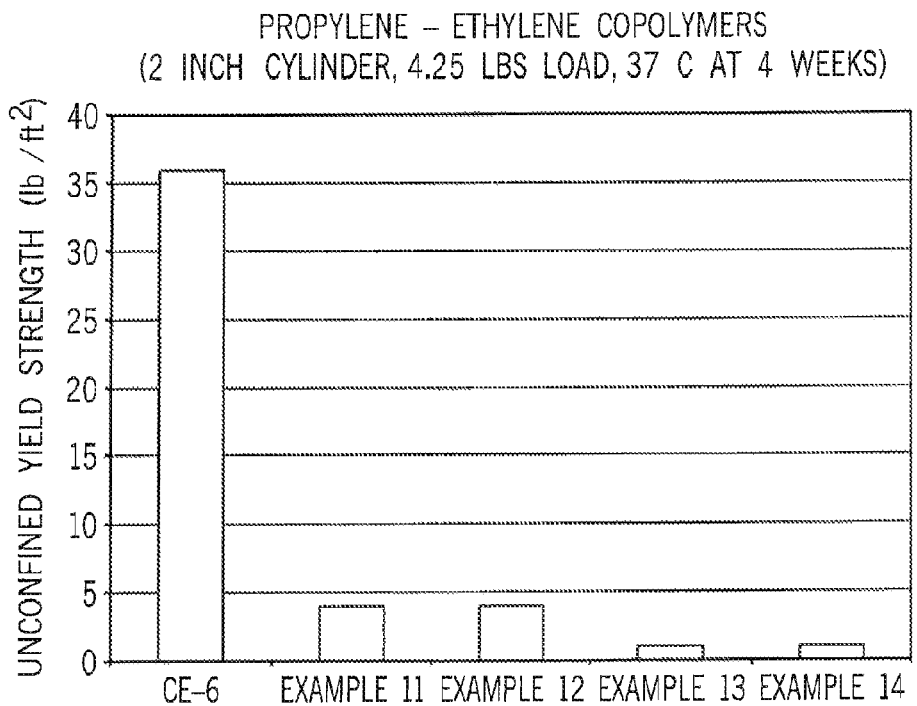

For each sample, approximately 100 grams of pellets are placed in a 2-inch diameter, two-piece "clam shell" metal cylinder. A 4.25 pound (lb) load is place on the pellets in the cylinder. This amount of weight simulates the load placed on the bottom layer of an eight layer pallet (50 lb bags). The cylinders with the pellets are placed in an oven at 37° C. After 4 weeks the cylinders with pellets are removed from the oven, the load is removed, and the outside metal cylinders are opened. The unconfined yield strength is determined (units of pounds per square feet (lb/ft$^2$) from the maximum load (lb) on the pellets before fracture. The data of FIGS. 7A and 7B clearly demonstrate the non-blocking character of the inventive copolymers.

TABLE 5

Description of the Copolymers Used for the Blocking Comparison

| Ex. | I2 (230° C.) | Density (g/cc) | Catalyst Type | Additional Copolymer Description | Ethyl (wt %) |
|---|---|---|---|---|---|
| CE6 | 2 | 0.8585 | B | — | 15 |
| 8 | 2 | 0.8585 | A | Base Copolymer | 15 |
| 9 | — | — | — | Ex. 8 with 10 wt % Ethylene-Octene Copolymer | |
| 10 | — | — | — | Ex. 8 with 10 wt % Random Polypropylene Copolymer | |
| 11 | 8 | 0.8585 | A | Base Copolymer | 15 |
| 12 | — | — | — | Ex. 11 with 10 wt % Ethylene-Octene Copolymer | |
| 13 | — | — | — | Ex. 11 with 10 wt % Random Polypropylene Copolymer | |
| 14 | 25 | 0.8585 | A | Base Copolymer | 15 |

Compositional Drift Analysis

Samples:

Three samples are evaluated using GPC-FT/IR methodology. Examples 15 and 16 use propylene-ethylene copolymers prepared with Catalyst A. For comparison, a random copolymer polypropylene sample (CE8) is also evaluated. The comparative sample is produced with a conventional Ziegler-Natta catalyst. All three samples are further described in TABLE 6.

Measurement:

The GPC-FT/IR technique allows for the measurement of fractional polymer compositions as a function of polymer molecular weight. This characterization technique utilizes gel permeation chromatography (GPC) coupled with Fourier Transform Infrared Spectroscopy (FT/IR). For this analysis, a Waters high temperature GPC unit (#150C) is coupled to a Magna System 560 FT/IT (Water Corp, Milford, Mass.). The mobile phase or solvent is tetrachloroethylene. The following references described this technique.

P. J. Deslauriers, D. C. Rohlfing, E. T. Hsieh, "Quantifying Short Chain Branching in Ethylene 1-olefin Copolymers using Size Exclusion Chromatography and Fourier Transform Infrared Spectroscopy", Polymer, 43, 159-170 (2002).

R. P. Markovich, L. G. Hazlitt, L. Smith, ACS Symposium Series: Chromatography of Polymers, 521, 270-276 (1993).

The samples are dissolved in tetrachloroethylene and analyzed on the GPC-FT/IR. The samples are separated by molecular weight fraction and as these fractions elute, they are analyzed by the FT/IR. For propylene based polymers, the infrared spectral region from 2750 to 3050 cm$^{-1}$ is obtained as a function of molecular weight. Within this spectral region, the partial absorbance area at greater than 2940 cm$^{-1}$ is used for the methyl content. From these measurements, one skilled in the art can develop ethylene content calibration curves for comparing the compositional drift of the samples versus the molecular weight distribution. The compositional drift is calculated as the weight percent ethylene content at the 90% cumulative. GPC fraction and at the 10% cumulative GPC fraction. These two ethylene values are subtracted and the result is then divided by the weight percent ethylene content of the sample.

Figure 8A:
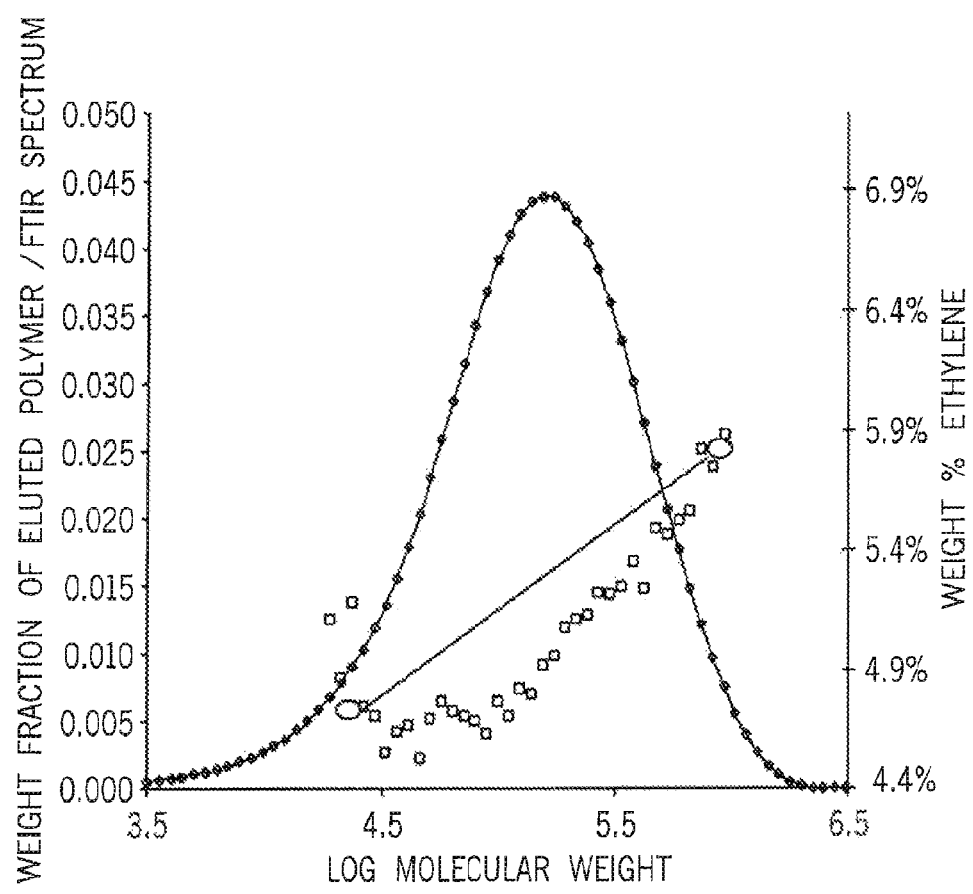
FIGS. 8A-8C are gel permeation chromatograph (GPC)/Fourier Transform Infrared (FTIR) spectrographs showing the ethylene content versus $\log_{10}$ molecular weight of inventive samples 15 and 16, respectively, and comparative sample CE8.
Figure 8B:
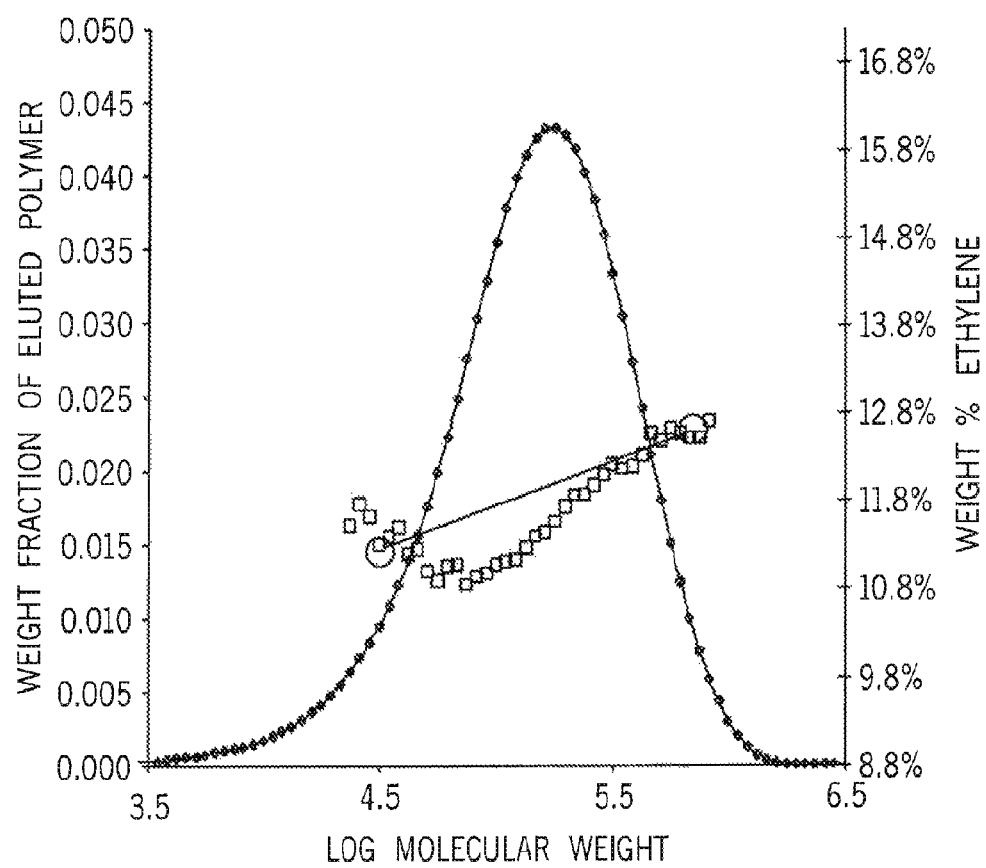
Figure 8C:
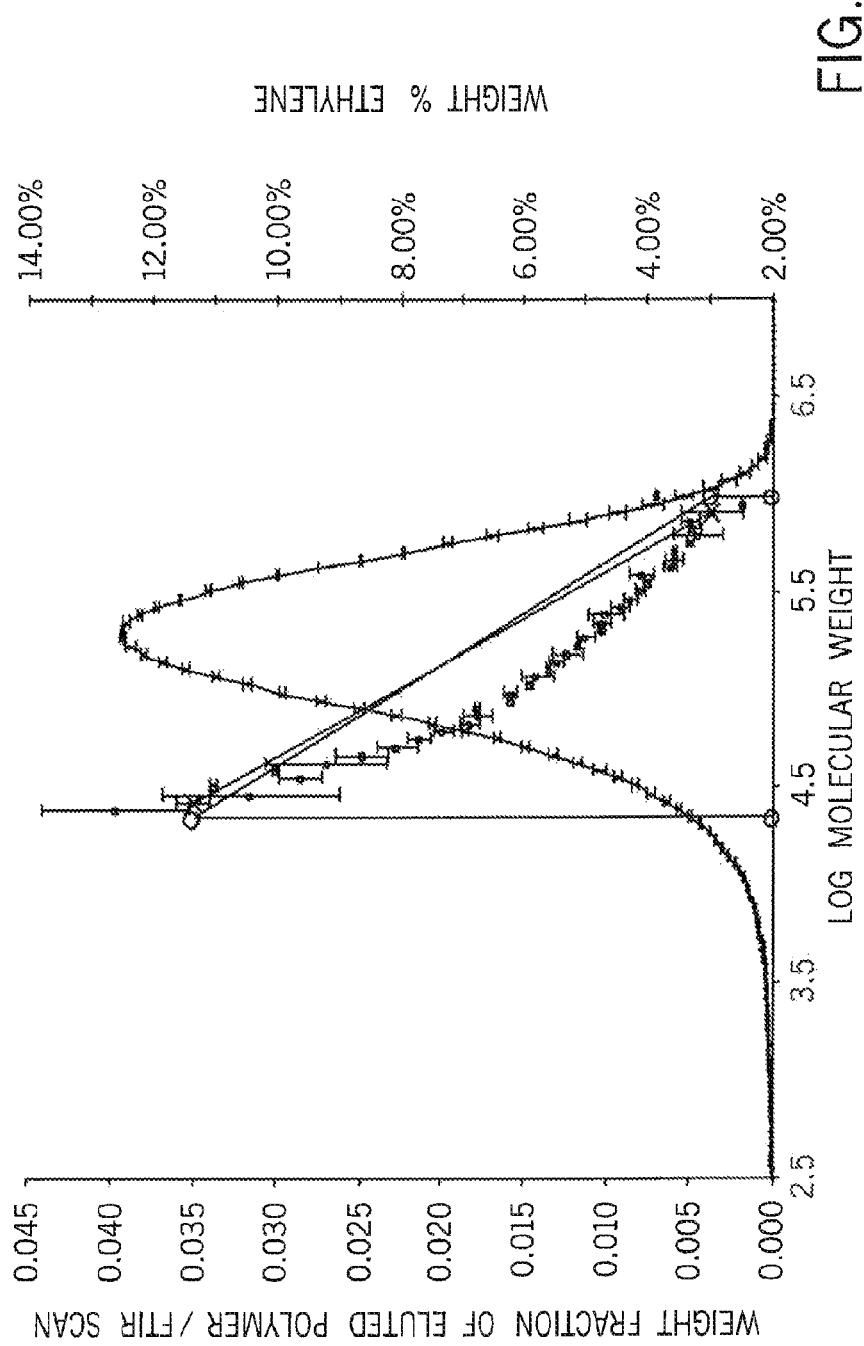

Analysis:

The GPC-FT/IR curves for the three samples are shown in FIGS. 8A-8C. These data show the ethylene content versus log molecular weight. From these data, the compositional drift is calculated. A summary of the compositional drift data are presented in TABLE 6.

TABLE 6

Selected Properties of P-E Copolymers and Compositional Drift Data

| Sample No. | FIG. | I2 (230° C.) | Wt % Ethylene | Isotacticity (mole % mm) | Compositional Drift |
|---|---|---|---|---|---|
| 15 | 8A | 8 | 5 | 96 | 21 |
| 16 | 8B | 8 | 12 | 96 | 8 |
| CE8 | 8C | 7 | 5.5 | 93 | −150 |

Extensional Viscosity Analysis

Samples:

Extensional viscosity measurements are made on a propylene-ethylene comparative example (CE9), on two different propylene-ethylene polymers of the invention (17 and 18), and on a PRO-FAX PF814 by Basell Polyolefins (a post-reactor, branched polypropylene) (CL10) comparative example. Extension flow measurements are described in John Dealy and Ronald Larson, *Structure and Rheology of Molten Polymers* (2006), Hanser Publishers, Munich.

The "degree of strain hardening" is further defined in the above reference (Chapter 10, pp. 381 and 382). One skilled in the art can calculate the "degree of strain hardening" by comparing and measuring extensional flow and melt viscosity data.

TABLE 7

Sample Information

| Example No. | Catalyst | Reactor Temperature |
|---|---|---|
| CE1 | B | 100° C. |
| 1 | A | 130° C. |

TABLE 7-continued

Sample Information

| Example No. | Catalyst | Reactor Temperature |
|---|---|---|
| 4 | A | 165° C. |
| CE10 | Not Applicable | Not Applicable |

Specimen Preparation:

Test specimens for extensional viscosity measurement are prepared on a programmable Tetrahedron bench top press. The program held the melt at 177° C. (350° F.) for 5 minutes at a pressure of 1500 psi (10$^7$ Pa). The chase is then removed to the bench top to cool. The 0.79 mm thick chase is Teflon coated with three 77×51 mm$^2$ rectangles. After the samples are pressed, test specimens are die-cut using a punch press and a handheld die with the dimensions of 10×18 mm$^2$ (W×L). The specimen's thickness (usually in the range of 0.7~1.2 mm) and width are measured and recorded. These measurements are entered in the test setup and used in the instrument calculations.

Test specimens for melt viscosity measurement are prepared on a programmable Tetrahedron bench top press. The program held the melt at 177° C. (350° F.) for 5 minutes at a pressure of 1500 psi (10$^7$ Pa). The chase is then removed to the bench top to cool. The Teflon coated chase was 3 mm thickness and produced 25 mm diameter test specimens (i.e., disks). These disks are used for measuring the melt viscosities of the examples.

Figure 9A:
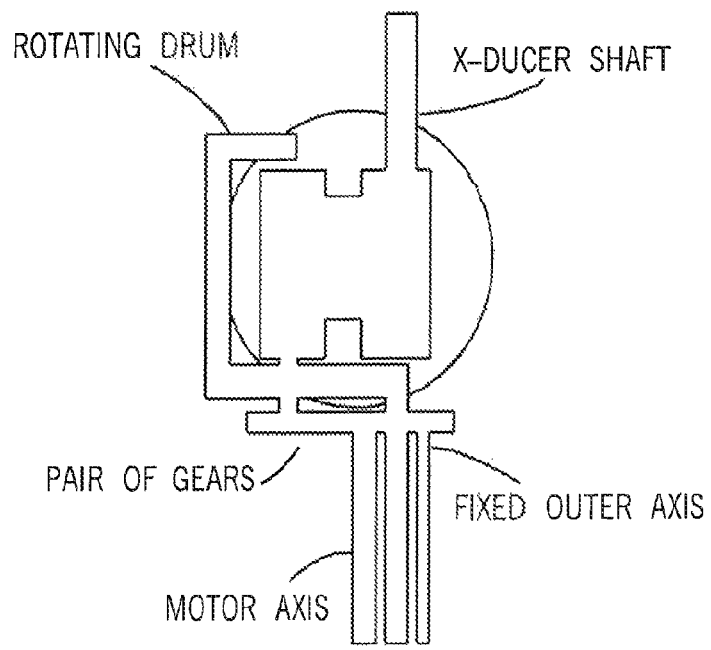
FIGS. 9A and 9B illustrate the extensional viscosity fixture used in the Examples.
Figure 9B:
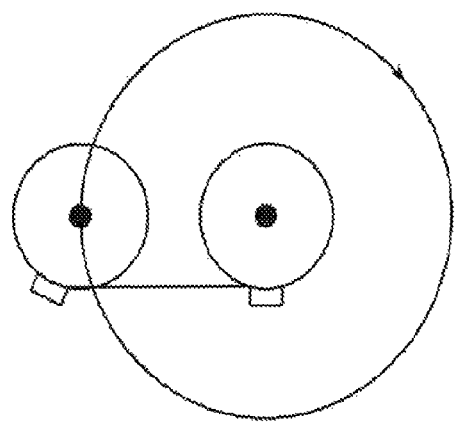
Figure 10:
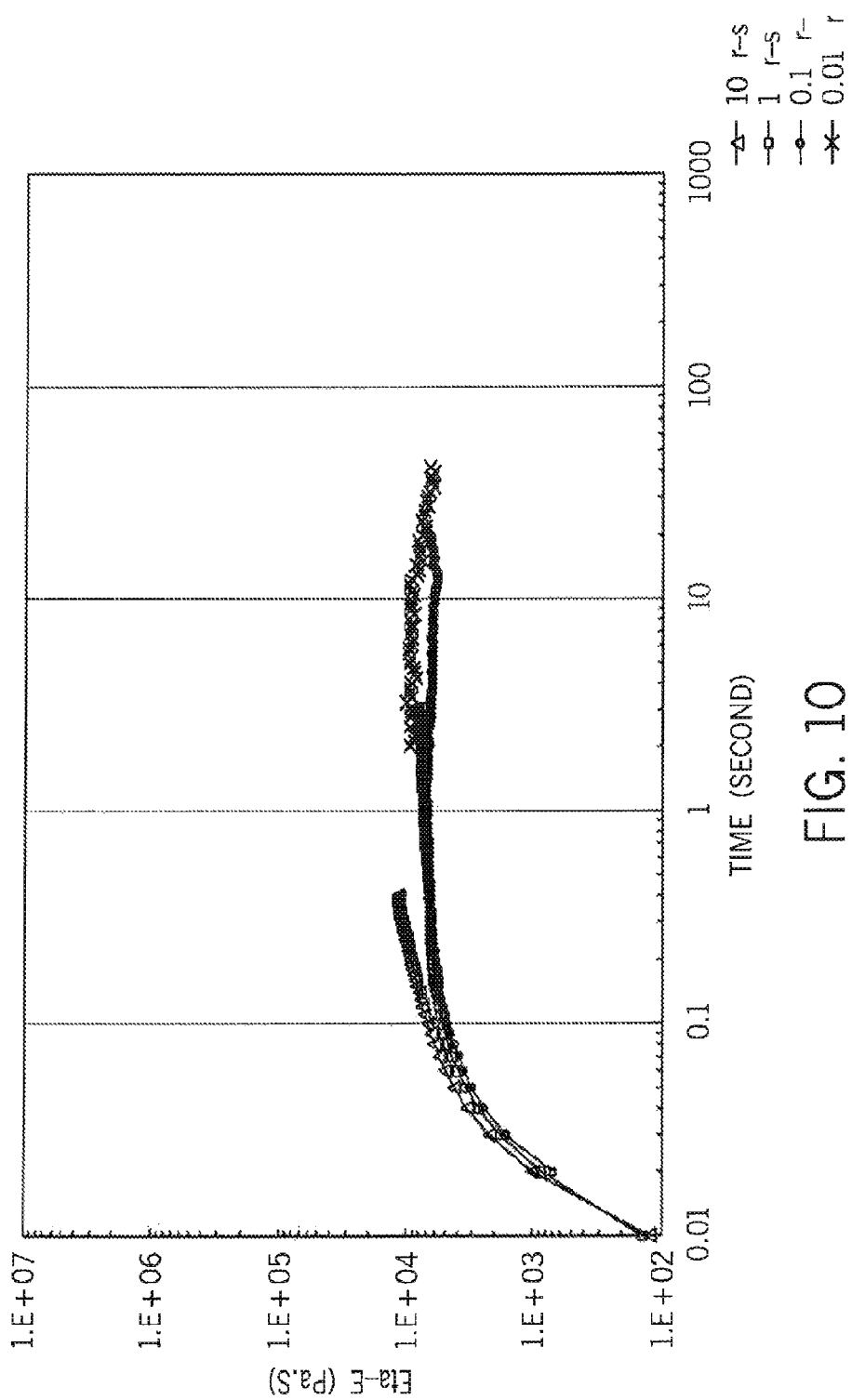
FIG. 10 is an extensional viscosity plot measured at 180° C. for comparative example CF1.

Measurements:

Extensional viscosities are measured at 180° C. by using the Extensional Viscosity Fixture (EVF). FIGS. 9A and 9B show sketches of the fixture. The fixture is designed to be accommodated in an ARES rheometer oven. The polymer film is attached onto each of the two drums by a pin. The oven is then closed to let the temperature equilibrate. The test starts with rotating the outer drum around the center drum while the center drum is fixed during the test as shown in FIG. 9B. The entire test is divided into three zones. The first zone is the pre-stretch zone that stretches the film at a very low strain rate (0.005 s$^{-1}$) for 11 seconds. The purpose of this step is to reduce film buckling caused by film loading. It is followed by a relaxation zone (10 sec) to minimize the effect of possible residual stress introduced during compression molding. The third zone is the stretch zone where the data are used for analysis. Four Hencky strain rates of 0.01, 0.1, 1 and 10 s$^{-1}$ are applied for each sample, and a new specimen is used for each strain rate.

Melt viscosities are measured at 180° C., by using a dynamic mechanical spectrometer (ARES Rheometer, TA Instruments). Each polymer specimen is placed in the ARES rheometer oven between two 25 mm diameter, parallel metal fixtures. The oven is closed to let temperature equilibrate. The distance between the two metal fixtures is adjusted to a 2 mm gap. Melt viscosity values for each sample are then obtained from 0.1 to 100 s$^{-1}$. These melt viscosity data are used with the extension viscosity data to calculate the "degree of strain hardening".

Results and Analysis:

FIGS. 10-13 show the extensional viscosity result for the samples. It can be seen from FIG. 10 that the CE1 sample produced with Catalyst B does not show any significant strain hardening at all four strain rates. The result indicates no long chain branching is present in the sample. This is because in linear semicrystalline polymers, such as PE, PP, the molecular weight of the molecules has to be extremely high to achieve strain hardening at experimentally accessible strain rate, and this is not the case for the samples in this study. The extensional viscosity result is also consistent with the GPC-Triple Detector data where no deviation from the linear reference material was observed in the Mark-Houwink plot.

Figure 11:
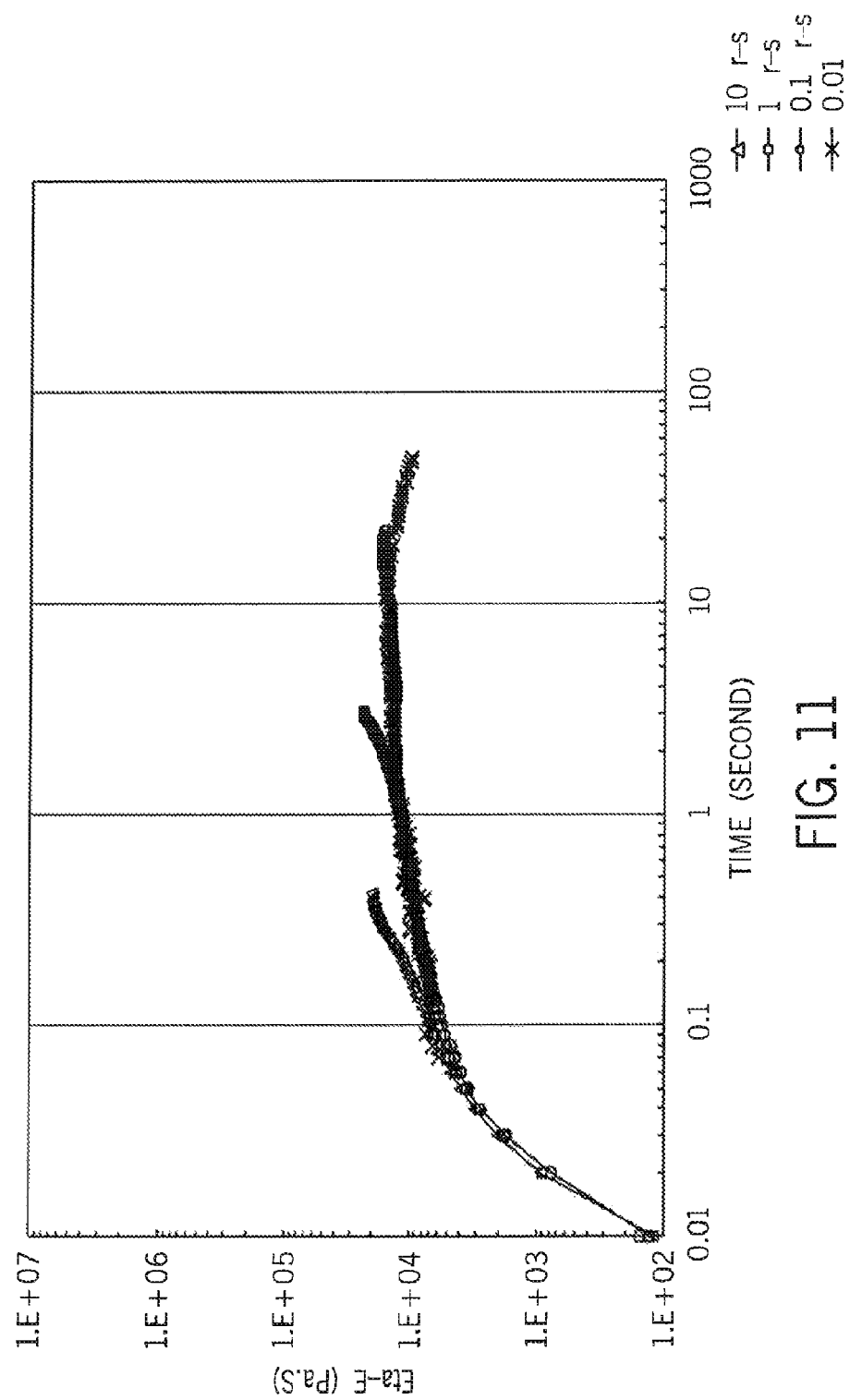
FIG. 11 is an extensional viscosity plot measured at 180° C. for sample 1 and at a reactor temperature of 130° C.
Figure 12:
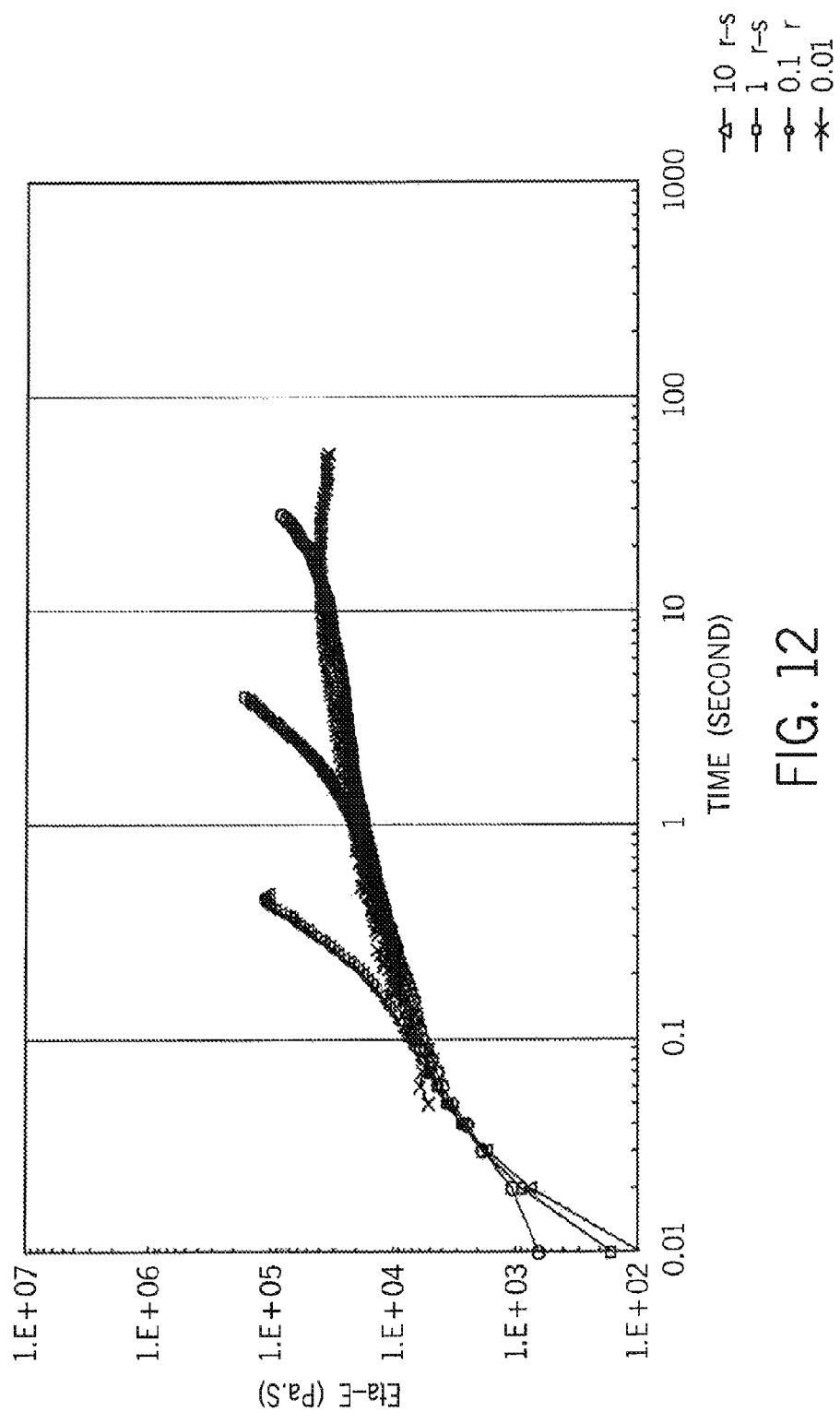
FIG. 12 is an extensional viscosity plot measured at 180° C. for sample 4 and at a reactor temperature of 165° C.
Figure 13:
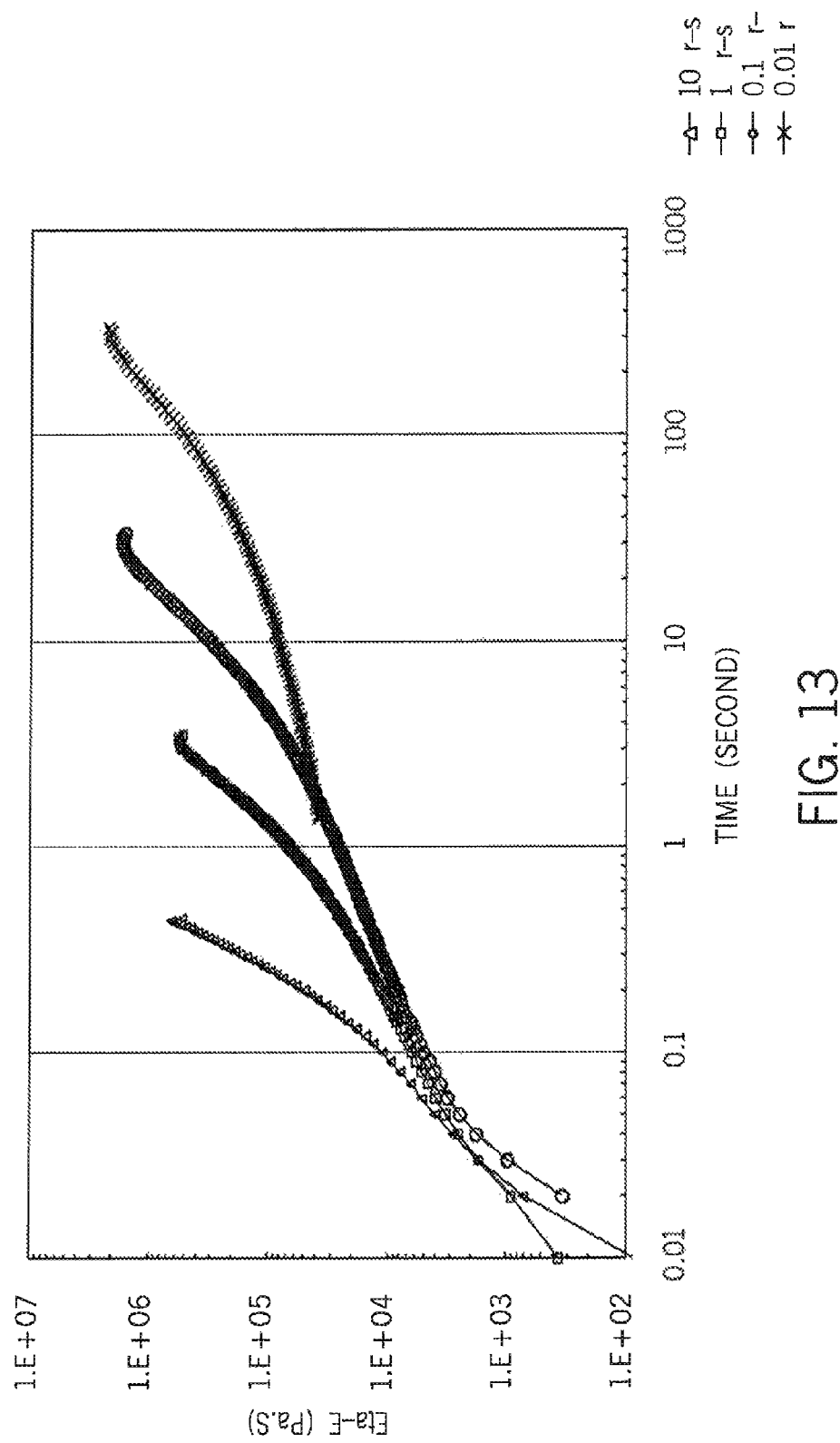
FIG. 13 is an extensional viscosity plot measured at 180° C. for comparative example CE10.

However, for molecules with multi-branched molecular structure, strain hardening can be easily obtained. FIGS. 11 and 12 show the extensional viscosity result for Samples 1 and 4, respectively, made Catalyst A but at different reactor temperatures. Strain hardening can be observed for both samples, and the sample made at higher (165° C.) reactor temperature show much stronger strain hardening than that of the one made at lower reactor temperature (130° C.). As a comparison, the extensional viscosity of CE 10, a commercially available, post-reactor modified, highly long-chain branched polypropylene sample, is measured at the same condition. The result is shown in FIG. 13. Even stronger strain hardening can he observed from the plot.

A method for qualitatively evaluating and comparing the strain hardening of different materials is the use of a "reduced" extensional viscosity or "degree of strain hardening", which is defined as below:

$$\eta_{ER}^+(t, \dot{\varepsilon}) \equiv \frac{\eta_E^+(t, \dot{\varepsilon})}{3\eta^+(t)}$$

where $\dot{\varepsilon}$ is the strain rate, $\eta_E^+$ is the extensional viscosity and $\eta^+$ is the viscosity obtained from linear visco-elastic measurement at the same temperature, such as frequency sweep or the start-up of the low shear rate steady shear measurements. In theory this value should be equal to one if there is no strain hardening and should be greater than one if strain hardening is present. For these evaluations the viscosity value $\eta^+$ from the melt viscosity measurement at the same temperature (180° C.) is used.

Table 8 compares the degree of strain hardening values, as calculated using the above equation, for the reported samples. For these calculations, the extensional viscosity data are obtained and compared at a strain rate of 1 $s^{-1}$ and at the elongation measurement time of 3.0 seconds. The corresponding melt viscosity values are obtained at a strain rate of 1 $s^{-1}$.

TABLE 8

Degree of Strain Hardening at a Strain Rate of 1 $s^{-1}$ and at the Elongation Measurement Time of 3 Seconds

| Example No. | Degree of Strain Hardening @ 1 $s^{-1}$ and Elongation of Measurement Time of 3 sec | Isotacticity (% mm) |
|---|---|---|
| CE1 | 1.0 | 97 |
| 1 | 1.9 | 96 |
| 4 | 4.6 | 96 |
| CE10 | 26.5 | >99 |

Although the invention has been described in considerable detail through the above specification and examples, this detail is for the purpose of illustration. Many variations and modifications can be made without departing from the spirit and scope of the invention as described in the following claims.

We claim:

1. A substantially isotactic propylene interpolymer having an average of 0.001 long chain branches per 1000 total carbons and comprising (A) at least 60 weight percent (wt %) units derived from propylene, and (B) between 1 and 40 wt % units derived from ethylene, the propylene interpolymer characterized by (1) a g' ratio of less than 1 measured at interpolymer number average molecular weight (Mn) and (2) a relative compositional drift of less than 50%.

2. The isotactic propylene interpolymer of claim 1 which is further characterized by propylene chain segments having a chain isotacticity triad index of at least 70 mole percent.

3. The isotactic propylene interpolymer of claim 1 in which the g' ratio is less than 0.96.

4. The isotactic propylene interpolymer of claim 1 in which the relative compositional drift of less than 40%.

5. The isotactic propylene interpolymer of claim 1 in which the propylene chain segments have a chain isotacticity triad index of at least 80 mole percent.

6. The isotactic propylene interpolymer of claim 1 comprising between 1 and 20 wt % units derived from ethylene.

7. The isotactic propylene interpolymer of claim 1 further characterized by at least one of the following properties:
   (a) A weight average molecular weight (Mw) of at least 50,000 grams per mole (g/mol);
   (b) A unimodal molecular weight distribution, and an Mw/Mn of less than 4;
   (c) A critical shear rate at the onset of surface melt fracture (OSMF) of at least 4,000 $sec^{-1}$; and
   (d) A nominal weight percent crystallinity of from greater than 2 to 40 wt %.

8. The isotactic propylene interpolymer of claim 7 further comprising at least two of properties (a)-(d).

9. The isotactic propylene interpolymer of claim 7 having a Mw/Mn of less than 3.5.

10. An article comprising the propylene interpolymer of claim 1.

11. A film, fiber, sheet, tube, molded profile, coating, dispersion, emulsion or foam comprising the propylene interpolymer of claim 1.

12. A substantially isotactic propylene interpolymer having an average of 0.001 long chain branches per 1000 total carbons and comprising (A) at least 90 weight percent (wt %) units derived from propylene, and (B) between 1 and 10 wt % units derived from ethylene, the propylene interpolymer characterized by a $\log_{10}$ intrinsic viscosity of less than 0.5 at a $\log_{10}$ weight average molecular weight of 5.8, a g' ratio of less than 1 measured at interpolymer number average molecular weight (Mn) and a relative compositional drift of less than 50%.

13. A substantially isotactic propylene interpolymer having an average of 0.001 long chain branches per 1000 total carbons and comprising (A) at least 90 weight percent (wt %) units derived from propylene, and (B) between 1 and 10 wt % units derived from ethylene, the propylene interpolymer characterized by a $\log_{10}$ intrinsic viscosity of less than 0.35 at a $\log_{10}$ weight average molecular weight of 5.5, a g' ratio of less than 1 measured at interpolymer number average molecular weight (Mn) and a relative compositional drift of less than 50%.

14. The article of claim 10 wherein the article is a multilayer film prepared by cast, blown, calendered or extrusion coating processes.

15. The article of claim 14 wherein the article is at least one of a greenhouse film, heat-seal film, shrink film, lamination film, biaxially-oriented film, extrusion coated film, liner, over-wrap film and agricultural film.

16. The article of claim 10 wherein the article is a multicomponent fiber.

17. The fiber of claim 16 wherein the fiber is a core/sheath fiber in which the substantially isotactic propylene interpolymer comprises an outer surface layer.

18. The fiber of claim 17 wherein the fiber is a staple fiber, tow fiber, twisted fiber or monofilament.

19. A crosslinked, substantially isotactic propylene interpolymer of claim 1.

20. A blend comprising the substantially isotactic propylene interpolymer of claim 1 and at least one other polymer.

* * * * *